(12) United States Patent
Yagi et al.

(10) Patent No.: US 8,004,223 B2
(45) Date of Patent: Aug. 23, 2011

(54) WHEEL DRIVING APPARATUS AND ELECTRIC VEHICLE INCLUDING THE SAME

(75) Inventors: Hiroaki Yagi, Shizuoka (JP); Hideki Matsueda, Shizuoka (JP); Mikio Saitou, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 426 days.

(21) Appl. No.: 12/389,859

(22) Filed: Feb. 20, 2009

(65) Prior Publication Data

US 2009/0212728 A1    Aug. 27, 2009

(30) Foreign Application Priority Data

Feb. 21, 2008    (JP) ................. 2008-039609

(51) Int. Cl.
H02P 25/00    (2006.01)
(52) U.S. Cl. .............. 318/400.41; 318/268; 318/271; 318/437
(58) Field of Classification Search ........... 318/400.41, 318/263, 268, 271, 276, 278, 437; 310/156.01, 310/261.1, 209, 348, 349
See application file for complete search history.

(56) References Cited

U.S. PATENT DOCUMENTS

| | | | |
|---|---|---|---|
| 5,763,977 A * | 6/1998 | Shimasaki et al. ............ | 310/191 |
| 5,929,578 A | 7/1999 | Atarashi | |
| 7,151,335 B2 * | 12/2006 | Tajima et al. ............ | 310/156.48 |
| 7,288,910 B2 * | 10/2007 | Dooley .................... | 318/400.21 |
| 7,550,891 B2 * | 6/2009 | Kim ....................... | 310/216.092 |
| 7,622,875 B2 * | 11/2009 | Atarashi et al. .......... | 318/400.41 |
| 2006/0061310 A1 | 3/2006 | Takai et al. | |

FOREIGN PATENT DOCUMENTS

| | | |
|---|---|---|
| EP | 1 115 196 A2 | 7/2001 |
| EP | 1 615 319 A1 | 1/2006 |
| EP | 1 670 124 A2 | 6/2006 |
| EP | 1 713 171 A1 | 10/2006 |
| EP | 1 873 900 A1 | 1/2008 |
| JP | 09-037598 A | 2/1997 |
| JP | 10-248285 A | 9/1998 |
| JP | 2002-325412 A | 11/2002 |
| JP | 2005-168190 A | 6/2005 |
| JP | 2006-094588 A | 4/2006 |
| WO | 2005/076462 A1 | 8/2005 |
| WO | 2008/006906 A1 | 1/2008 |

OTHER PUBLICATIONS

Official communication issued in counterpart European Application No. 09002361.5, mailed on Mar. 30, 2009.

* cited by examiner

*Primary Examiner* — Walter Benson
*Assistant Examiner* — Thai Dinh
(74) *Attorney, Agent, or Firm* — Keating & Bennett, LLP

(57) ABSTRACT

An electric bike includes a wheel driving apparatus. The wheel driving apparatus includes an electric wheel drive motor which drives a wheel, a gap changer which changes a gap length in the wheel drive motor, and a motor control unit which controls the wheel drive motor and the gap changer. The motor control unit calculates a target gap length for the gap changing motor in the gap changer based on an accelerator opening-degree signal, a rotation speed, a q-axis electric-current command value, a power source voltage, and a voltage utilization rate. Then, a feedback control is provided to the gap changer based on a difference value between the target gap length and the actual gap-length. A good vehicle characteristic is obtained without being affected by individual variability or operating environment of the electric motor through efficient drive of the electric motor from a low-speed range through a high-speed range.

14 Claims, 33 Drawing Sheets

F I G. 1
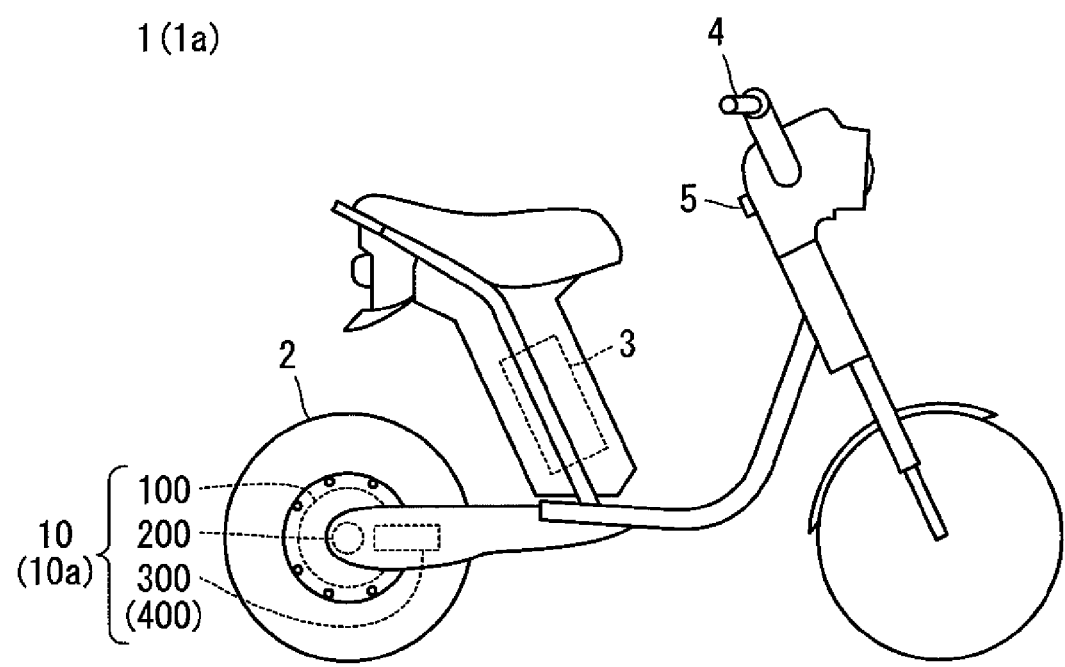

F I G. 2
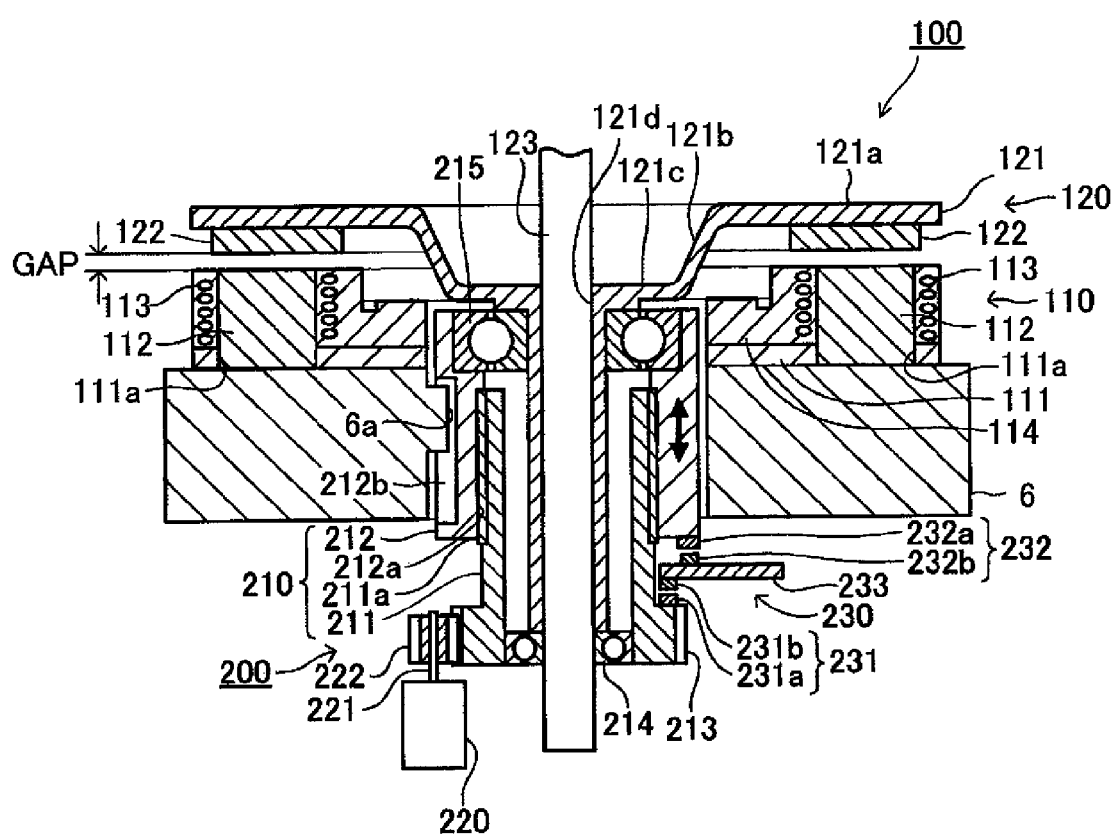

F I G. 5
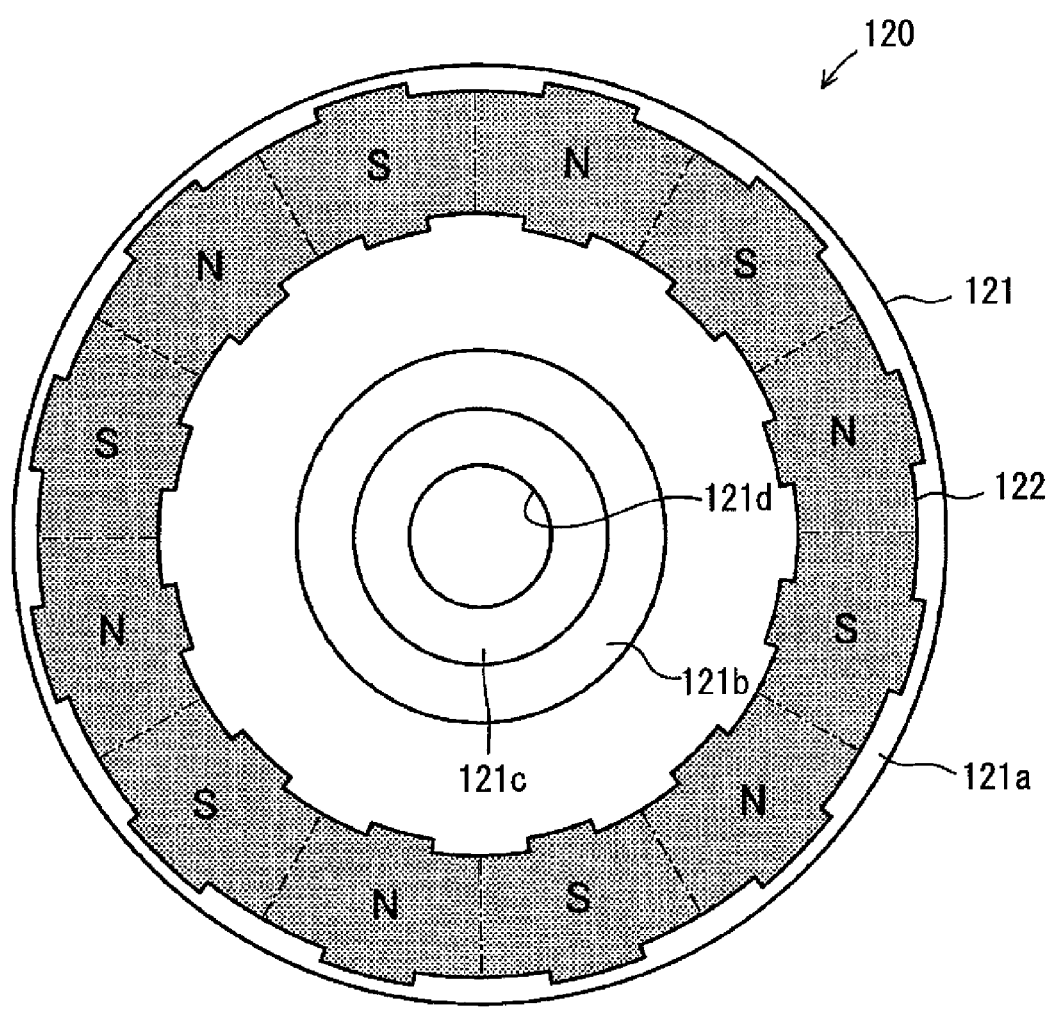

F I G. 8
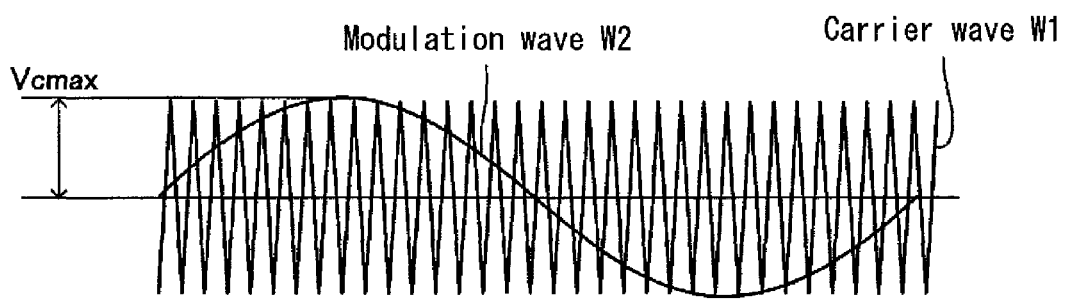

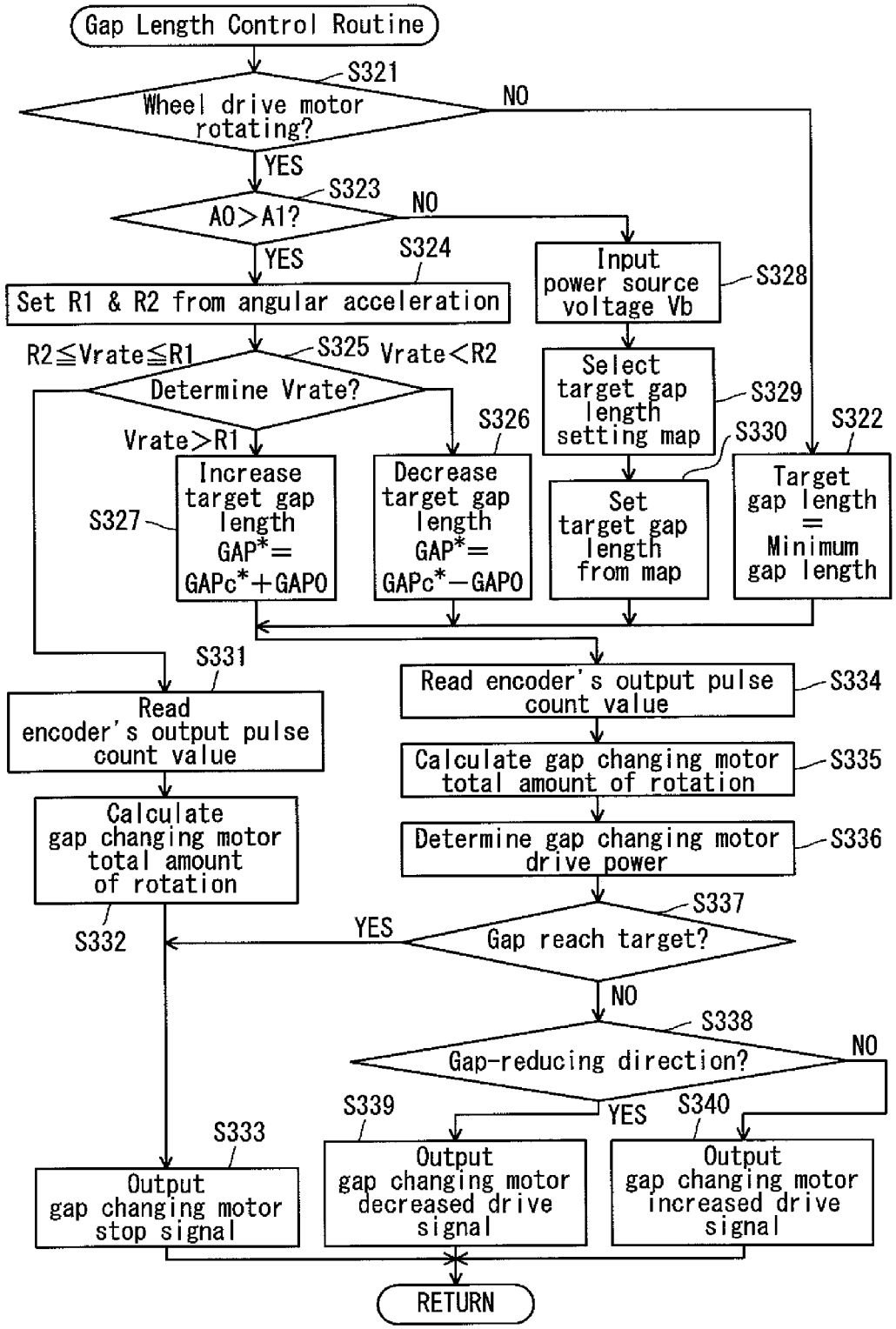

F I G. 1 3
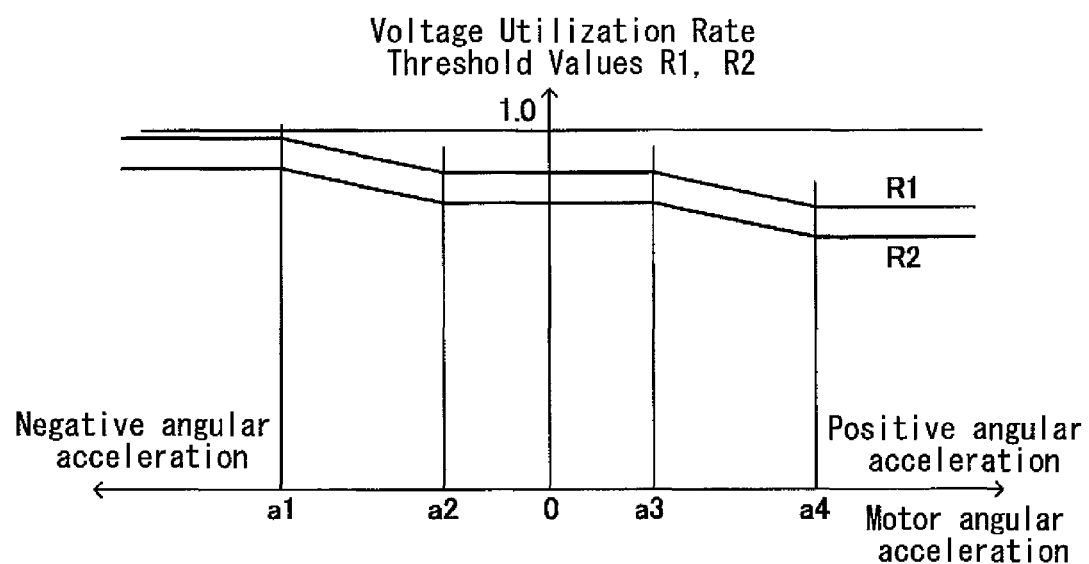

F I G. 1 4
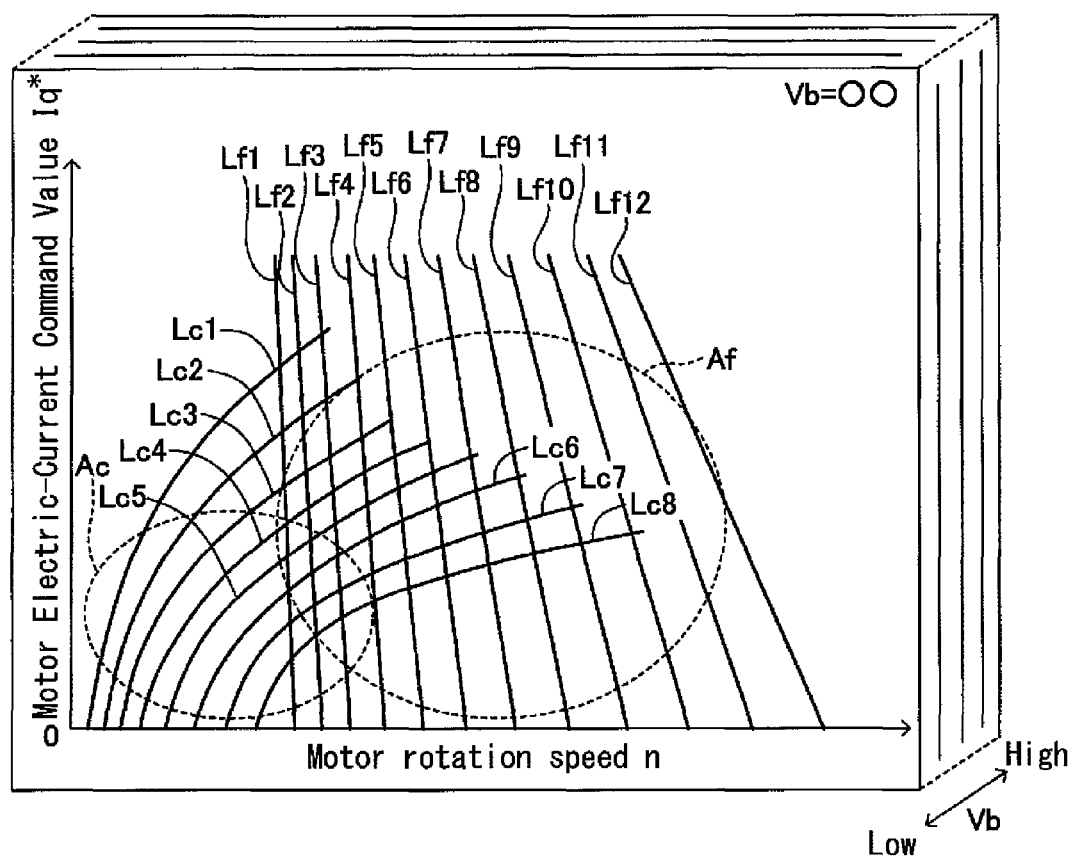

F I G. 1 5
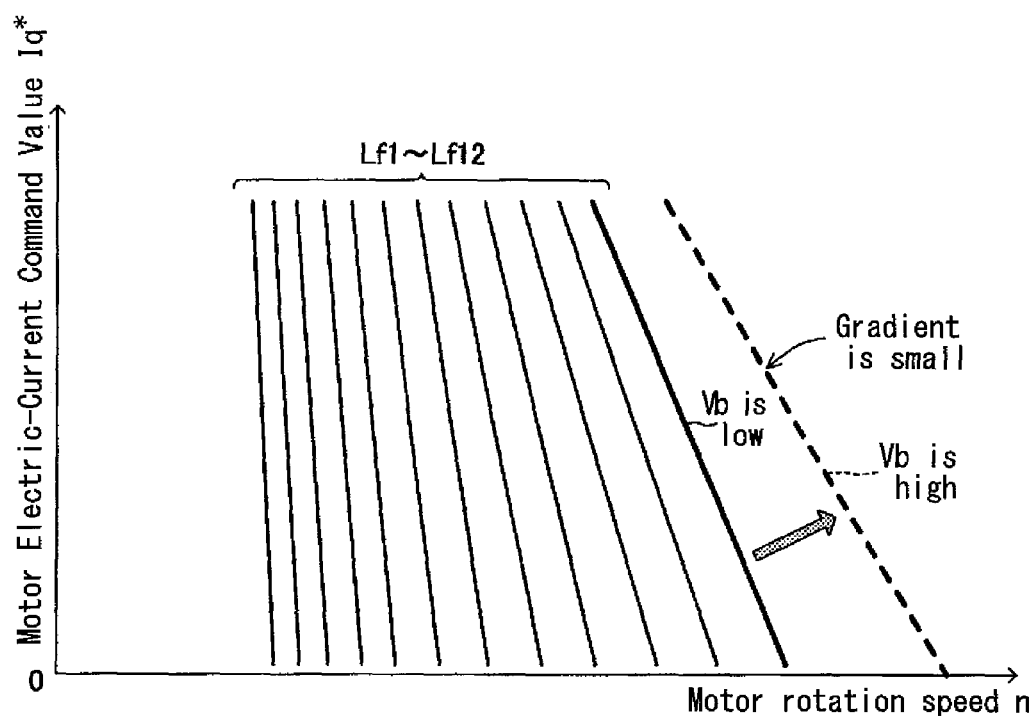

F I G. 2 2
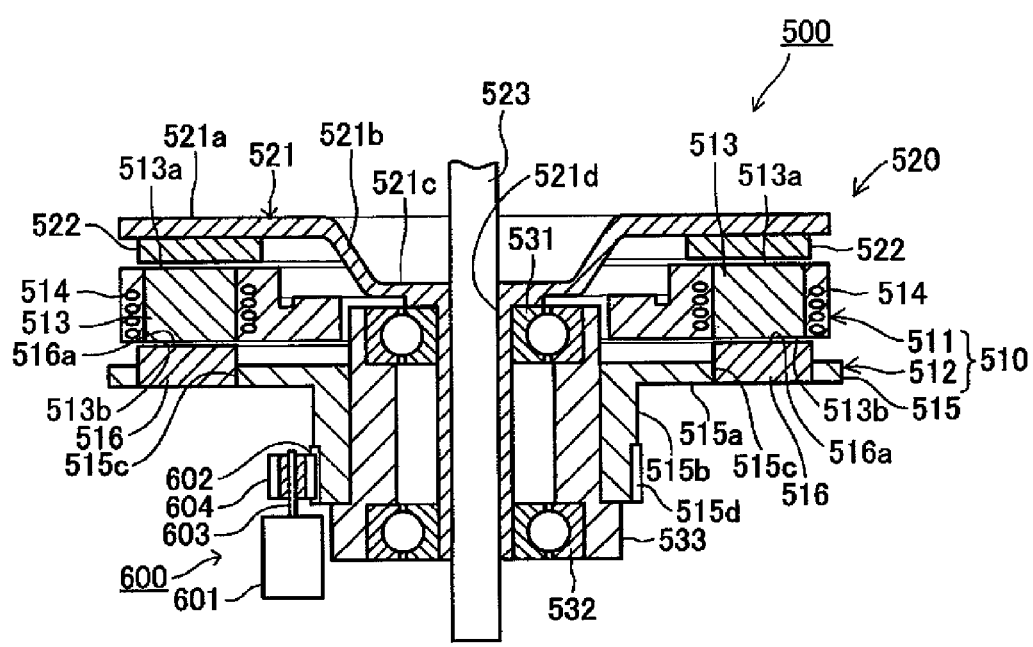

F I G. 2 4
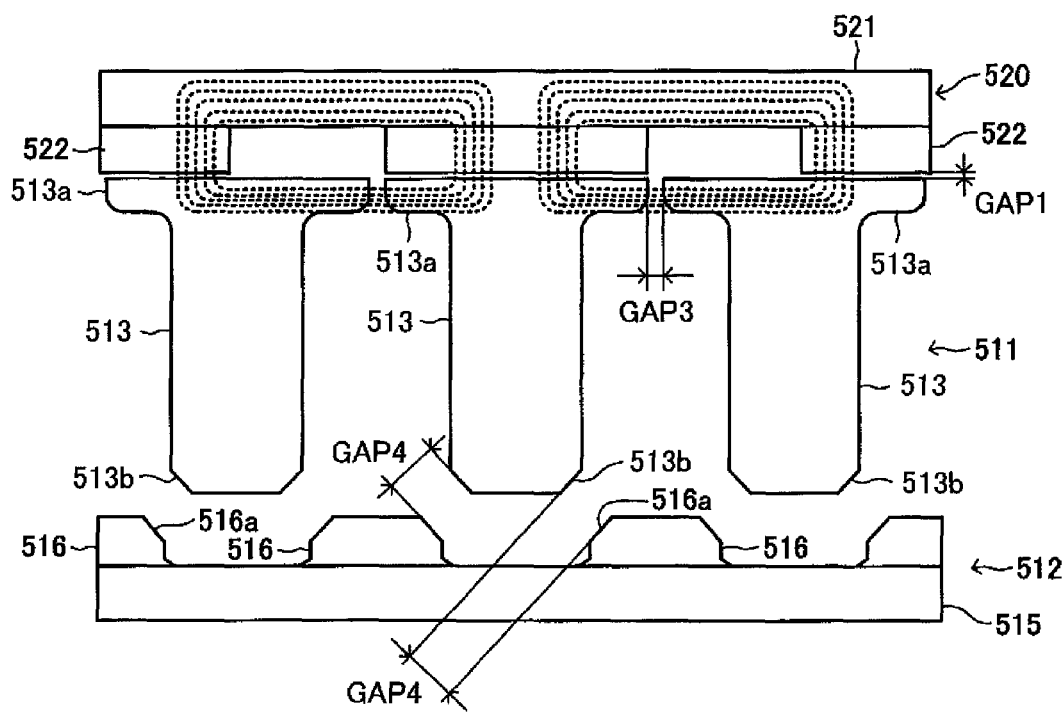

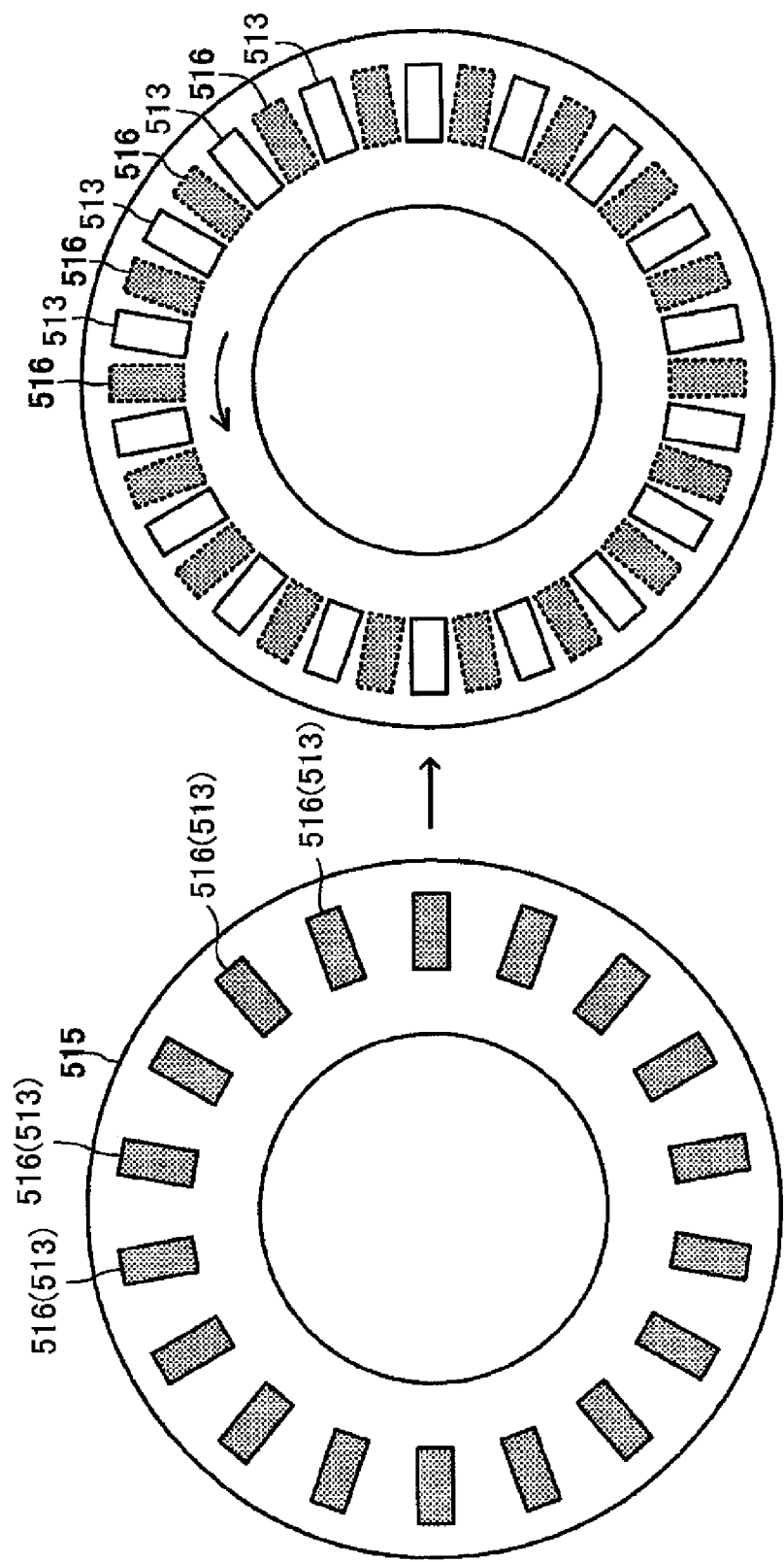

F I G. 3 0
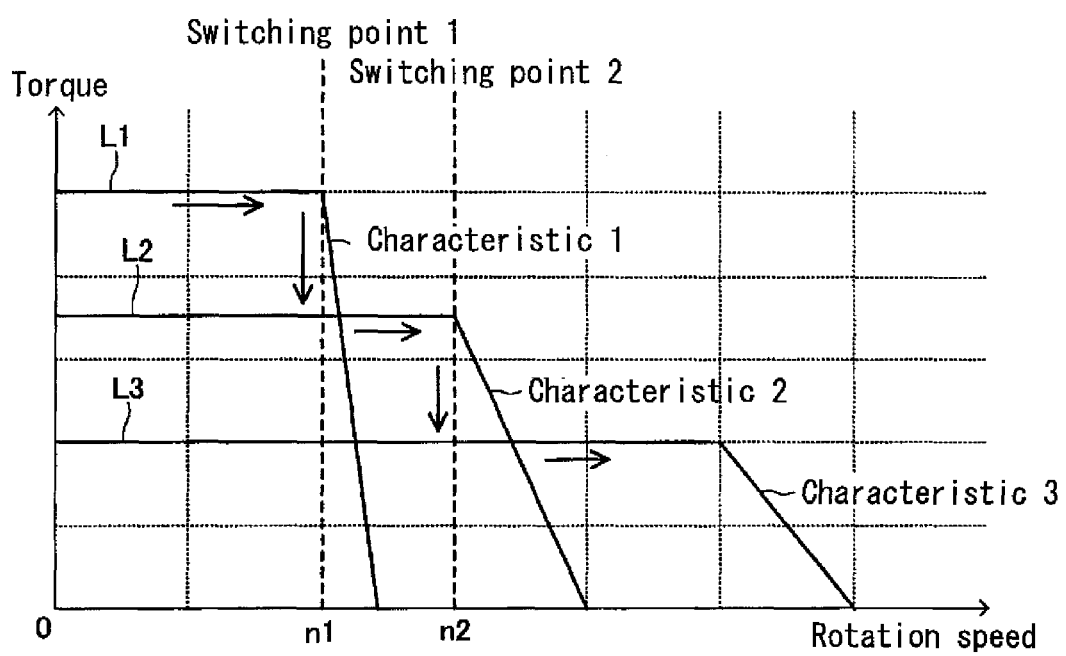

F I G. 3 1
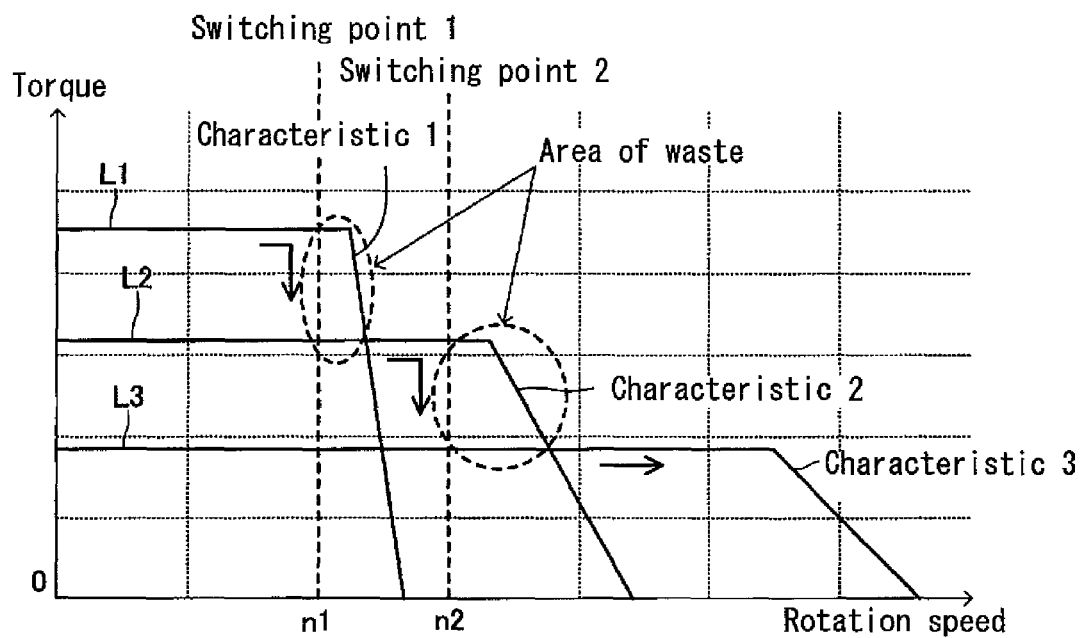

F I G. 3 3
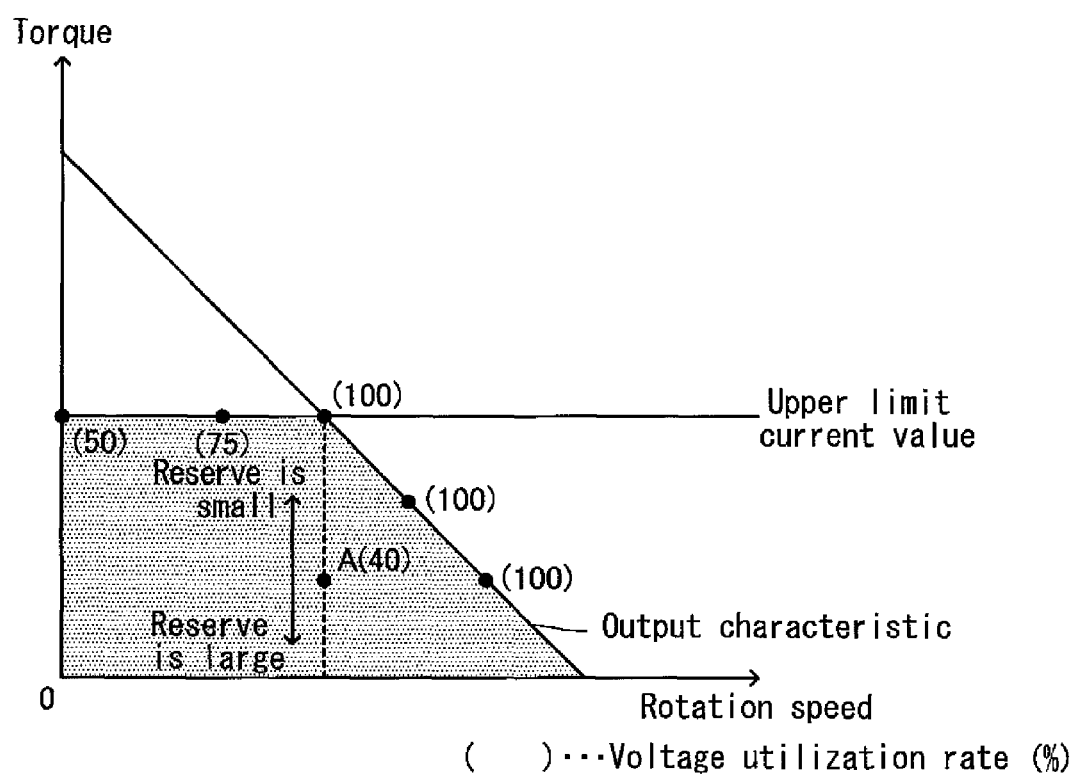

WHEEL DRIVING APPARATUS AND ELECTRIC VEHICLE INCLUDING THE SAME

BACKGROUND OF THE INVENTION

1. Field of the Invention

The present invention relates to a wheel driving apparatus and an electric vehicle, and more specifically, to a wheel driving apparatus which drives a wheel with an electric motor, and to an electric vehicle including the wheel driving apparatus.

2. Description of the Related Art

Conventionally, electric vehicles such as electric scooters drive their wheels with an electric motor by controlling the motor's revolution (rotation speed) based on the amount of accelerator operation. When controlling the electric motor's rotation speed, a wide driving range from a high-torque low-rotation-speed to a low-torque high-rotation-speed is used so as to drive the electric motor efficiently.

As an electric motor to achieve this, there is known a variable air-gap permanent-magnet motor which is disclosed in JP-A 2005-168190, for example. The variable air-gap permanent-magnet motor includes a disc-shaped rotor provided with a permanent magnet, a stator having an armature coil and disposed to oppose the rotor, and a hydraulic mechanism for sliding thereby moving the stator inside the motor's casing. With this arrangement, by controlling the hydraulic mechanism, a gap length between the rotor and the stator is adjusted.

JP-A 2005-168190 discloses an arrangement in which a relationship between motor rotation speed and target gap length is stored in a reference map, for example, and when the motor is driven, the hydraulic mechanism is operated so as to achieve a target gap length which is appropriate to the actual motor rotation speed. The document also discloses an arrangement that a relationship between motor rotation speed and target gap length is stored in advance in a reference map, for example, in accordance with estimated motor shaft torque values, and when the motor is driven, a target gap length is obtained from the estimated shaft torque value and the motor rotation speed, and then the hydraulic mechanism is operated so as to achieve the obtained target gap length.

An output characteristic of electric motors differs from one motor to another depending on individual variability of the motor (for example, mechanical dimension tolerance of the air gap and magnetic flux density tolerance of the permanent magnets) as well as the motor's operating environment (for example, magnet temperature and power source voltage). For this reason, setting the target gap length in accordance with motor rotation speed as in the electric motor disclosed in JP-A 2005-168190 will result in an inability to achieve an appropriate gap length if the actual motor output characteristic is not identical with the expected characteristic (characteristic as designed).

Now, description will be made for the output characteristic of electric motors (a relationship between rotation speed and torque).

As shown in FIG. 26, electric motors have a characteristic that their maximum torque decreases linearly with an increase in the rotation speed (the amount of revolutions per unit time). Also, in order to protect motor driving circuits such as inverters, an upper limit current value is set for the electric current which is applied to the electric motor. Since the electric motor's torque is generally proportional to the applied current, the upper limit current value limits a maximum value of the applied current. For example, if the inverter's circuit element (FET) is set to have an upper limit current value of 100 A, a maximum torque will be a torque attained when this upper limit current value is applied. Therefore, actual drive control range for the electric motor is represented by a hatched range shown in FIG. 27.

When the gap length of the electric motor is changed, an output characteristic (rotation-speed vs. torque characteristic) of the electric motor changes. FIG. 28 shows an example where the gap length is changed in three levels. In FIG. 28, a solid line shows Characteristic 1 which is a characteristic when the gap length is short (gap length G1), a broken line shows Characteristic 3 which is a characteristic when the gap length is long (gap length G3), and a dashed line shows Characteristic 2 which is a characteristic when the gap length is in the middle (gap length G2: G1<G2<G3). Under the state of Characteristic 1, high torque is obtained but the motor cannot rotate at a high speed. Under the state of Characteristic 3, the motor can rotate at a high speed but high torque is not obtainable. Characteristic 2 is an intermediate characteristic between the two. Therefore, by changing the gap length, it is possible to achieve a drive control characteristic of the electric motor as indicated by a solid line in FIG. 29. For example, by changing the gap length in the pattern of G1→G2→G3, it is possible to change the output characteristic in the pattern of Characteristic 1→Characteristic 2→Characteristic 3. By using an electric motor which has such a capability of varying the gap length for a wheel drive motor of an electric vehicle, a vehicle characteristic capable of driving from a high-torque low-rotation-speed range through a low-torque high-rotation-speed range can be achieved.

In order to drive the electric motor efficiently, it is desirable that the gap length is switched at a switching timing where the electric motor is capable of performing at its maximum potential, i.e., on its output characteristic line. Here, reference will be made to FIG. 30 to explain the gap length switching timing. In this example, the gap length is varied in three levels (G1, G2, G3: G1<G2<G3). At a time of starting the electric motor, a short gap length G1 is selected in preference of torque over rotation speed. In this case, the state of the electric motor (torque, rotation speed) changes on Current Limiting Line L1 in a direction indicated by arrows. The current Limiting Line L1 shows torques obtained when the gap length is G1 and the applied current is the upper limit current value. Also, Current Limiting Line L2 shows torques obtained when the gap length is G2 and the applied current is the upper limit current value, whereas Current Limiting Line L3 shows torques which are obtained when the gap length is G3 and the applied current is the upper limit current value.

If the gap length is changed from G1 to G2 when the electric motor's rotation speed has increased to a cross point between Current Limiting Line L1 and Characteristic 1 line (rotation speed n1), it is possible to change the output characteristic at a point where the motor is performing at its maximum potential. At this point, the output torque decreases to a level limited by Current Limiting Line L2, and the rotation speed increases while maintaining this torque. Likewise, when the state of the electric motor (torque, rotation speed) has reached a cross point between Current Limiting Line L2 and Characteristic 2 line (rotation speed n2), the gap length is switched from G2 to G3. As described above, it is possible to make the electric motor perform at its maximum potential capacity by switching the gap length on the output characteristic line.

In a case where the switching of the gap length is based on motor rotation speed as in JP-A 2005-168190, there would be no problem in switching the gap length at those points where the rotation speed n1 or n2 has been detected if the output characteristic of electric motors is identical with the expected characteristic (characteristic as designed). However, if the actual output characteristic of the electric motor is different from the expected characteristic, the switching timing can be inappropriate and such problems may arise as the electric motor's potential is not utilized sufficiently or the drive feeling is not as good.

For example, take a case that the electric motor's torque tends to be weaker than the output characteristic shown in FIG. 30. Then, when the gap length is switched as shown in FIG. 31 at each point where the rotation speed n1 or n2 is detected, switching of the gap length tends to be too early as compared to the increase in rotation speed. In this case, the electric motor's potential capability cannot be utilized in the areas circled by broken lines. In other words, the rotation speed could have been increased further while maintaining the maximum torque, yet the gap length was switched, making it impossible to obtain advantageous torques available from the electric motor.

Conversely, in a case where the electric motor's torque tends to be stronger than the expected characteristics, switching timing will be too late if the gap length is switched as shown in FIG. 32, at each point where the rotation speed n1 or n2 is detected. In this case, the torque will drop dramatically before the gap length is switched as shown in the area enclosed by a broken line. This torque drop will result in a decreased drive feeling. For example, when the vehicle is starting to run, there will be a feeling for a moment that the vehicle is losing acceleration.

SUMMARY OF THE INVENTION

In order to overcome the problems described above, preferred embodiments of the present invention provide a wheel driving apparatus and an electric vehicle that drives an electric motor efficiently from a low-speed range through a high-speed range without being affected by individual variability or operating environment of the electric motor, thereby offering a good vehicle characteristic.

According to a preferred embodiment of the present invention, there is provided a wheel driving apparatus for driving a wheel of an electric vehicle. The apparatus includes an electric motor arranged to drive the wheel, a gap changer arranged to change a gap length which is a length of an air gap in the electric motor, an accelerator information obtaining device arranged to obtain accelerator information regarding an amount of acceleration in the electric vehicle, a voltage calculation device arranged to calculate a control voltage command value based at least on the accelerator information obtained by the accelerator information obtaining device, a voltage utilization rate calculation device arranged to calculate a voltage utilization rate based on a maximum value of the control voltage command value and the control voltage command value calculated by the voltage calculation device, and a gap controller arranged to control the gap changer based on the voltage utilization rate calculated by the voltage utilization rate calculation device, so as to adjust the gap length.

In the electric motor, there is provided an air gap which functions as a magnetic resistance, i.e., a magnetic resistance space in the magnetic path. By changing the gap length, the magnetic resistance is changed and an output characteristic of the electric motor changes. In a preferred embodiment, the gap controller controls the gap changer based on the voltage utilization rate to change the gap length, and therefore to change the output characteristic of the electric motor.

As shown in FIG. 33, the points where the voltage utilization rate is 100% are on the output characteristic line (maximum torque line). The voltage utilization rate decreases as the electric motor's state of control becomes lower than the output characteristic line. This gives the electric motor a reserved capacity to output torque. In this case, the voltage utilization rate can be expressed as a value which can be obtained by first obtaining a torque value at the given state of control of the electric motor from the output characteristic chart in FIG. 33, and then dividing the torque value by a maximum torque (a torque on the characteristic line) which is available at the given rotation speed. For example, when the electric motor's state of control is at Point A in FIG. 33, the voltage utilization rate is 40%.

In an electric vehicle in which a wheel is driven by an electric motor, it is necessary, as the electric motor rotates at a higher speed, to shift to a low-torque high-rotation-speed characteristic (e.g., Characteristic 3 in FIG. 28). At this occasion, if the electric motor has a reserved torque outputting capacity, i.e., if the motor's state of control is below the characteristic line as indicated by Point A in FIG. 33, there is not an urgent need for switching to the low-torque high-rotation-speed characteristic, and it is possible to increase the rotation speed while maintaining the current torque. As the rotation speed is increased, the electric motor's state of control shifts from Point A to the right-hand direction, and eventually reaches a point where the voltage utilization rate is 100%.

Therefore, controlling the gap length based on the voltage utilization rate makes it possible to switch the output characteristic at an appropriate timing. In this case, ideally, the gap length should be changed at the point where the voltage utilization rate is 100%. However, in practice, a delayed response in the gap changer or the system must be taken into consideration and therefore it is reasonable to switch the gap length at a voltage utilization rate of about 90% to about 95%, for example.

In a preferred embodiment of the present invention, the output characteristic is changed by adjusting the gap length of the electric motor based on the voltage utilization rate, and therefore it is possible to change the output characteristic always at an appropriate timing without being affected by individual variability or operating environment of the electric motor. Thus, it is possible to sufficiently utilize the potential capability of the electric motor, and reduce a decrease in drive feeling when the vehicle is starting/accelerating. As a result, it is possible to drive the electric motor efficiently from a low-speed range through a high-speed range and to obtain a good vehicle characteristic.

Preferably, the gap controller controls the gap changer so as to increase the gap length if the voltage utilization rate is greater than a first threshold value, and to decrease the gap length if the voltage utilization rate is smaller than a second threshold value which is smaller than the first threshold value.

In other words, when the electric motor's control voltage-command value increases and the voltage utilization rate exceeds the first threshold value, then the gap controller increases the gap length. This changes the output characteristic of the electric motor, making available a high rotation speed. On the other hand, when the electric motor's control voltage-command value decreases and the voltage utilization rate becomes smaller than the second threshold value, then the gap controller decreases the gap length. This changes the output characteristic of the electric motor, and a high torque is obtained. As described, it is possible to control the output characteristic of the electric motor easily. Since no adjustment is made to the gap length when the voltage utilization rate is between the first threshold value and the second threshold value, it is possible to prevent such a problem of hunting in the control, and to achieve stable vehicle driving.

Further preferably, the wheel driving apparatus further includes an angular acceleration information obtaining device arranged to obtain angular acceleration information regarding the electric motor's angular acceleration, and a threshold value setting device arranged to decrease at least one of the first threshold value and the second threshold value with an increase in the angular acceleration information obtained by the angular acceleration information obtaining device.

When accelerating the electric vehicle, the electric motor's control voltage-command value is increased to increase the motor rotation speed. However, if there is a delay in the response from the gap changer to this motor control, there is a risk that it will become impossible to increase the motor rotation speed quickly. In other words, there is a risk that the shift in the motor characteristic from the high-torque low-rotation-speed characteristic to the low-torque high-rotation-speed characteristic caused by the gap length change will not appropriately follow the increase in the electric motor's rotation speed. On the other hand, when decelerating the electric vehicle, the electric motor's control voltage-command value is decreased to decrease the motor rotation speed. In this case again, a delayed response is not desirable.

To tackle this issue, the first threshold value is decreased with an increase in the electric motor's angular acceleration. This arrangement makes it possible to increase the gap length earlier in the course of accelerating the electric vehicle. Therefore, it becomes possible to increase the motor rotation speed quickly and to reduce delay in the response from the gap changer. On the other hand, if the second threshold value is decreased with an increase in the electric motor's angular acceleration, i.e., if the second threshold value is increased with a decrease in the electric motor's angular acceleration, then it becomes possible to decrease the gap length earlier in the course of decelerating the electric vehicle. Therefore, it becomes possible to decrease the motor rotation speed quickly and to reduce delay in the response from the gap changer. It should be noted here that the electric motor's angular acceleration is the electric motor's rotational acceleration, and is obtained by differentiating the motor's angular speed or rotation speed by time. The value takes a positive value when the electric motor is accelerating, while it takes a negative value when the electric motor is decelerating.

Further, preferably, the gap controller controls the gap changer based on the voltage utilization rate if the accelerator information has a value greater than a predetermined value, but does not control the gap changer based on the voltage utilization rate if the accelerator information has a value not greater than the predetermined value. For example, when the accelerator is operated to be moved in a closing direction to decelerate the electric vehicle, the electric motor's control voltage-command value decreases and the electric motor's voltage utilization rate decreases with the operation. In such a situation, the electric motor has a reserved capacity to output more torque than the demanded torque. However, if gap length adjustment is made based on the voltage utilization rate, the gap length is shortened, and results in increased iron loss. Thus, by not performing the gap length adjustment based on the voltage utilization rate if the accelerator information is not greater than the predetermined value, it becomes possible to reduce influence from iron loss.

Preferably, the wheel driving apparatus further includes a rotation speed information obtaining device arranged to obtain rotation speed information regarding a rotation speed of the electric motor. With this arrangement, the gap controller provides a first control mode of controlling the gap changer based on the voltage utilization rate if the accelerator information has a value greater than a predetermined value, and a second control mode of controlling the gap changer based on the rotation speed information obtained by the rotation speed information obtaining device if the accelerator information has a value not greater than the predetermined value. It is preferable that the gap controller controls the gap changer so as to increase the gap length with an increase in the rotation speed information in the second control mode. In this case, the electric motor's induced voltage does not exceed a DC power source voltage value, and this makes it possible to control the electric motor at a high-speed rotation.

Further preferably, the voltage calculation device includes an electric-current command value calculation device arranged to calculate a q-axis electric-current command value in a d-q axis coordinate system for the electric motor based on the accelerator information. With this arrangement, the gap controller controls the gap changer so as to increase the gap length with a decrease in the q-axis electric-current command value in the second control mode. When the amount of accelerator operation is small and the accelerator information is small, i.e., when the q-axis electric-current command value is small, there is no need for changing the output characteristic of the electric motor toward the high-torque low-rotation-speed side. Therefore, the gap length adjustment should be addressed for reduced iron loss in the electric motor. It is possible to reduce iron loss by increasing the gap length thereby reducing the amount of magnetic flux across the coils in the electric motor.

Further, preferably, the electric vehicle further includes a DC power source arranged to supply electric power to the electric motor. With this arrangement, the wheel driving apparatus further includes a voltage information obtaining device arranged to obtain voltage information regarding a voltage in the DC power source, and the gap controller controls the gap changer so as to increase the gap length with a decrease in the voltage information in the second control mode. In this case, the electric motor's induced voltage does not exceed the DC power source voltage, and this makes it possible to maintain the control of the electric motor.

Preferably, the wheel driving apparatus further includes a motor stoppage detector arranged to detect a stoppage of rotation of the electric motor. With this arrangement, the gap controller controls the gap changer so as to minimize the gap length regardless of the voltage utilization rate if the motor stoppage detector detects a stoppage of rotation of the electric motor. Therefore, a high torque is obtained when the electric vehicle is started next time, offering good acceleration.

Further preferably, the electric vehicle further includes a main switch, and the gap controller controls the gap changer so as to maximize the gap length regardless of the voltage utilization rate if the main switch is turned off. This arrangement makes it possible to reduce cogging torque which is generated by rotation of the electric motor in a case where the electric vehicle is pushed by hand for transportation.

Further, preferably, the wheel driving apparatus further includes a gap length detector arranged to detect the gap length. With this arrangement, the gap controller provides a feedback control to the gap changer based on a difference between a target gap length obtained by calculation based on the voltage utilization rate and the gap length detected by the gap length detector. In this case, an actual gap-length is fed back to the target gap length which was calculated based on the voltage utilization rate, to calculate an amount of control for the gap changer, and based on the calculation result, the gap changer is controlled. This improves the gap changer's response, making it possible to further improve the output characteristic of the wheel driving electric motor.

Preferably, the electric motor is provided by an axial air gap motor which includes a rotor having a rotation shaft, and a stator which faces the rotor at a distance in a direction in which the rotation shaft extends, and the gap changer changes the gap length between the rotor and the stator. By changing a relative positional relationship between the rotor and the stator in the axial direction of the rotation shaft as described above, the gap length can be easily changed.

Further preferably, the electric motor is an axial air gap motor which includes a rotor having a rotation shaft, and a stator facing the rotor at a distance in a direction in which the rotation shaft extends. In addition, the stator includes a first stator and a second stator opposed to each other at a distance in the direction in which the rotation shaft extends and variable in terms of relative position in a rotating direction of the rotor. With this arrangement, the gap changer varies the relative position of the first stator and the second stator in the rotating direction thereby changing the gap length between the first stator and the second stator. In this case, the gap length change can be performed easily even if there is no space provided for relative movement in the axial direction of the rotation shaft.

The above-described wheel driving apparatus can be used suitably in electric vehicles.

It should be noted here that the accelerator information is information relevant to the amount of acceleration, and has a value which varies as the amount of acceleration varies.

The angular acceleration information is information relevant to the electric motor's angular acceleration, and has a value which varies as the angular acceleration varies.

The rotation speed information is information relevant to the electric motor's rotation speed, has a value which varies as the rotation speed varies. It should be noted here that the electric motor's rotation speed is an amount of rotation per unit time which can be expressed in terms of rpm, for example, or other suitable units of measure.

The voltage information is information relevant to a voltage of DC power source, and has a value which varies as the voltage varies.

Other features, elements, steps, characteristics, aspects and advantages of the present invention will become more apparent from the following detailed description of preferred embodiments with reference to the attached drawings.

BRIEF DESCRIPTION OF THE DRAWINGS

FIG. 1 is a schematic diagram showing an electric bike according to a first preferred embodiment of the present invention.

FIG. 2 is a schematic sectional view showing a wheel driving electric motor and a gap changer (under a state of minimum gap length) according to the first preferred embodiment of the present invention.

FIG. 5 is a plan view showing a rotor of the wheel driving electric motor according to the first preferred embodiment of the present invention.

FIG. 8 is an explanatory diagram for describing a maximum control voltage command value in the first preferred embodiment of the present invention.

FIG. 12 is a flowchart showing a gap length control routine in the first preferred embodiment of the present invention.

FIG. 13 is a graph showing a reference map for setting threshold values in the first preferred embodiment of the present invention.

FIG. 14 is a graph showing a reference map for setting a target gap length in the first preferred embodiment of the present invention.

FIG. 15 is a graph showing characteristic changes in the target gap length setting reference map in the first preferred embodiment of the present invention.

FIG. 22 is a schematic sectional view showing a construction of a wheel drive motor and a gap changer according to a variation.

FIG. 24 is a development schematic showing a positional relationship between the first teeth and the second teeth according to the variation (non-opposed state).

FIGS. 25A and 25B are schematic diagrams which give two-dimensional interpretation of the positional relationship between the first teeth and the second teeth according to the variation.

FIG. 25A shows the opposed state whereas FIG. 25B shows the non-opposed state.

FIG. 30 is an explanatory diagram for describing an output characteristic obtained when the gap length is changed (under normal state).

FIG. 31 is an explanatory diagram for describing the output characteristic when the gap length is changed (under a state where torque values are weaker).

FIG. 33 is an explanatory diagram for describing a relationship between voltage utilization rate and output characteristic.

DETAILED DESCRIPTION OF THE PREFERRED EMBODIMENTS

Figure 3:
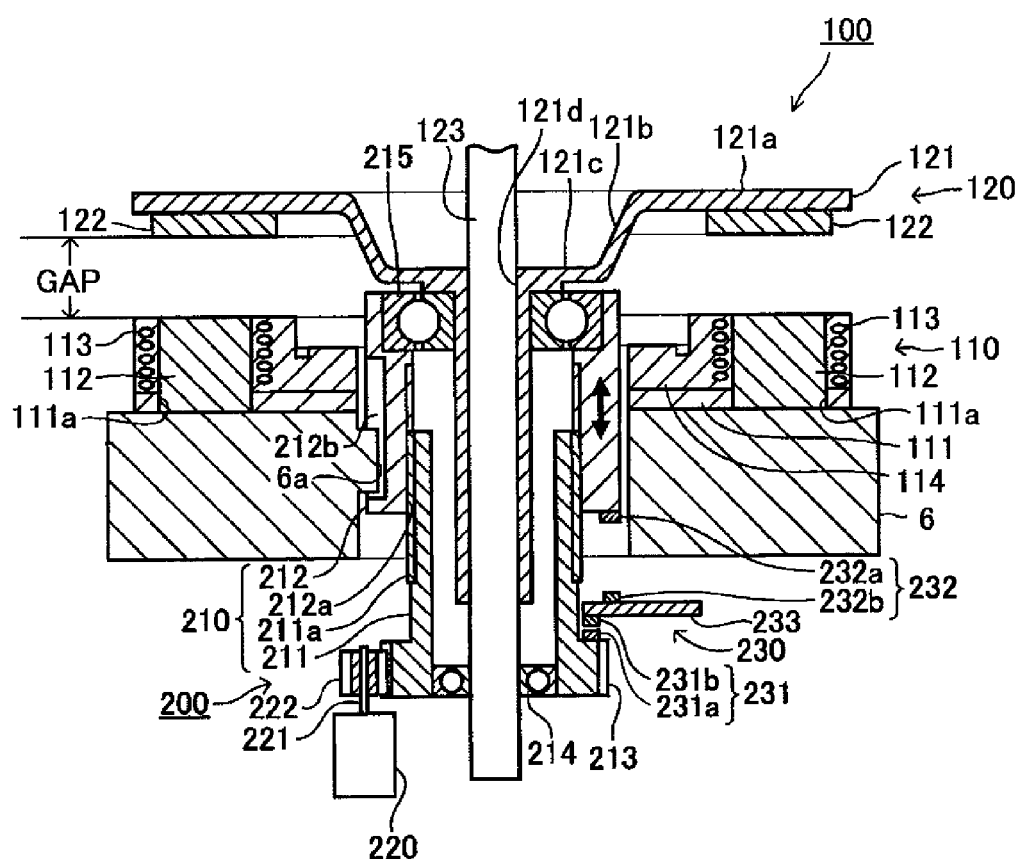
FIG. 3 is a schematic sectional view showing the wheel driving electric motor and the gap changer (under a state of maximum gap length) according to the first preferred embodiment of the present invention.

Hereinafter, preferred embodiments of the present invention will be described with reference to the drawings.

Referring to FIG. 1, an electric bike 1 according to the first preferred embodiment of the present invention preferably includes a wheel 2, a DC power source 3, an accelerator 4, a main switch 5, and a wheel driving apparatus 10. The DC power source 3 includes a battery, for example, and supplies electric power for driving the electric bike 1. The main switch 5 is a switch which starts and stops a control system for the entire electric bike 1.

The wheel driving apparatus 10 includes a wheel driving electric motor (hereinafter called "wheel drive motor") 100 which provides a rotating torque to the wheel 2, a gap changer 200 which changes the gap length GAP, i.e., a length of an air gap in the wheel drive motor 100, and a motor control unit 300 which controls the wheel drive motor 100 and the gap changer 200.

FIG. 2 and FIG. 3 are schematic sectional views which show a configuration of the wheel drive motor 100 and the gap changer 200.

The wheel drive motor 100 is preferably a three-phase permanent magnet axial air gap electric motor. The wheel drive motor 100 includes a stator 110 and a rotor 120. The stator 110 is disposed to face the rotor 120 at a predetermined distance provided in a direction (axial direction) in which a rotation shaft 123 of the rotor 120 extends.

The stator 110 includes an annular shaped stator yoke 111 made of magnetic steel plate, for example; a plurality (for example, eighteen, in the present preferred embodiment) of teeth 112 on the stator yoke 111; and a plurality of coils 113 wound around the teeth 112. The stator yoke 111 has a main surface which has a plurality (for example, eighteen, in the present preferred embodiment) of fitting holes 111a provided equidistantly in a circumferential direction. In each of the fitting holes 111a, one of the teeth 112 is fitted, with its end into the fitting hole 111a, so that each of the teeth 112 is magnetically connected with the stator yoke 111.

With each of the teeth 112 fixed to the stator yoke 111, and with each of the teeth 112 having the coil 113 wound around, the entire stator 110 is molded into a plastic or resin (hereinafter referred to as resin), and has an annular shape. In other words, the stator 110 is integrated into an annular shape by an annular shaped resin body 114.

Each of the teeth 112 is defined, for example, by a plurality of magnetic steel plates laminated one onto another. In each of the teeth 112, the surface which faces the rotor 120 is not covered by the resin, is perpendicular or substantially perpendicular to the rotation shaft 123, and has a flat surface.

Figure 4:
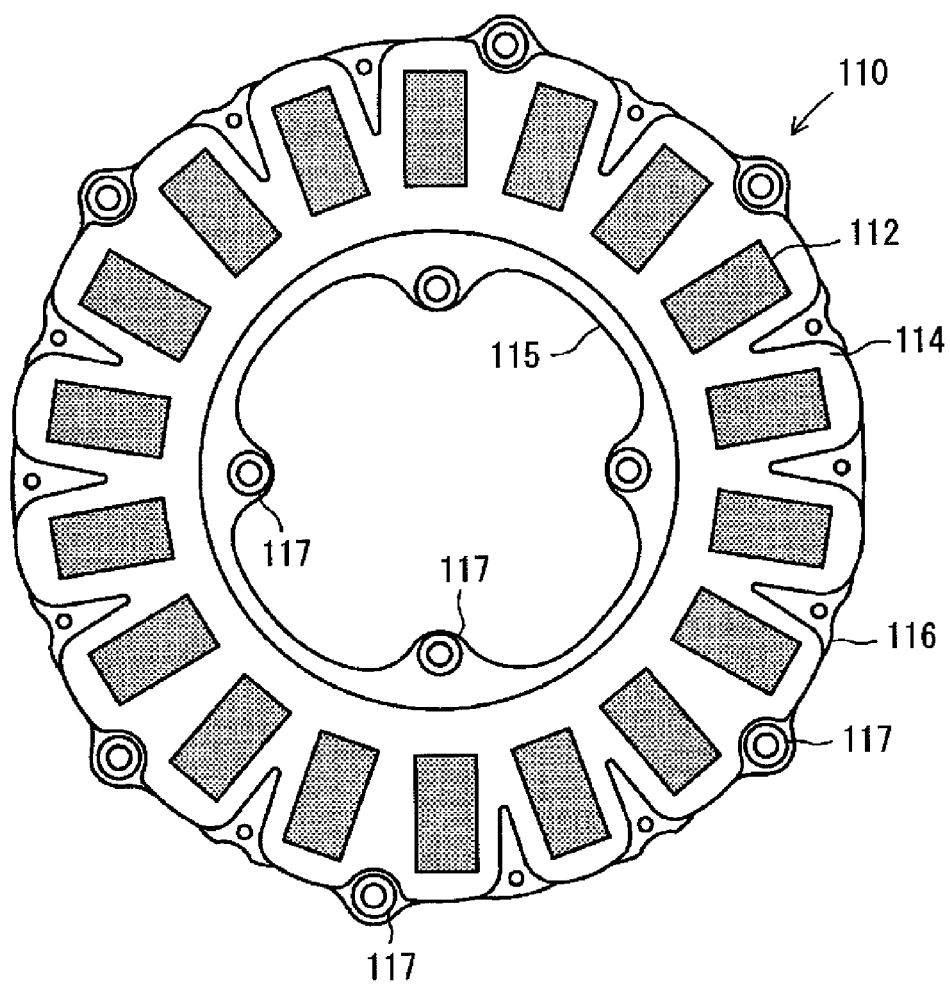
FIG. 4 is a plan view showing a stator of the wheel driving electric motor according to the first preferred embodiment of the present invention.

Referring to FIG. 4, the annular shaped resin body 114 has a center opening 115 and an outer circumferential portion 116, each embedded with a plurality of metal collars 117. The collars 117 and the stator yoke 111 have insertion holes (not illustrated) and by inserting set screws into these holes, the stator 110 is fixed to a cylindrical mount 6 which is part of the vehicle body.

Referring to FIG. 5, the rotor 120 includes a rotor yoke 121 made of iron, for example, and a magnet 122 fixed to the rotor yoke 121. The rotor yoke 121 has an outer plate portion 121a in the form of an annular shaped disc to which the magnet 122 is fixed, a tapered portion 121b extending from an inner circumferential end of the outer plate portion 121a while decreasing in its diameter, an inner plate portion 121c which is an annular shaped disc extending inward from an inner circumferential end of the tapered portion 121b in parallel or substantially parallel to the outer plate portion 121a, and a cylindrical portion 121d extending axially from an inner circumferential end of the inner plate portion 121c.

The motor rotation shaft 123 is inserted into the cylindrical portion 121d. The cylindrical portion 121d has an inner circumferential surface provided with axial female splines (not illustrated), whereas the motor rotation shaft 123 has an outer circumferential surface provided with axial male splines (not illustrated). The female splines and the male splines are mated with each other slidably in the axial direction. Therefore, the motor rotation shaft 123 is non-rotatable but axially slidable with respect to the cylindrical portion 121d. The motor rotation shaft 123 has an end (an upper end as seen in FIG. 2) which is connected with a wheel shaft of the wheel 2 via an unillustrated speed reduction mechanism.

As shown in FIG. 5, the magnet 122 is provided, for example, as a single member such as a ring-shaped bond magnet magnetized to have a plurality of N poles and S poles arranged alternately with respect to each other in a circumferential direction. The magnet 122 is fixed to the outer plate portion 121a of the rotor yoke 121 so as to face the teeth 112 of the stator 110. In the present preferred embodiment, the magnet 122 preferably includes six pairs of mutually adjacent pole regions (in each pair of regions, one is magnetized to an N pole and the other is magnetized to an S pole) on the surface facing the teeth 112. It should be noted here that, instead of the magnet 122 as a ring-shaped single plate, a plurality of individually magnetized, generally square or fan-shaped magnet pieces may be fixed to the outer plate portion 121a so that an S pole and an N pole are arranged alternately with respect to each other.

Returning to FIG. 2, the gap changer 200 includes a feed screw mechanism 210, a gap changing electric motor (hereinafter, referred to as "gap changing motor") 220, and a gap length detector 230. The feed screw mechanism 210 includes a threaded cylindrical body 211 which surrounds the cylindrical portion 121d of the rotor 120 and has an outer circumferential surface provided with a male thread 211a, and a cylindrical nut 212 which has an inner circumferential surface provided with a female thread 212a to thread on the male thread 211a of the threaded cylindrical body 211. The outer circumferential surface of the threaded cylindrical body 211 has an end provided with a gear 213.

A bearing 214 is provided between the inner circumferential surface of the threaded cylindrical body 211 and the motor rotation shaft 123, making the threaded cylindrical body 211 and the motor rotation shaft 123 coaxially rotatable to each other. Also, a bearing 215 is provided between the inner circumferential surface of the nut 212 and the outer circumferential surface of the cylindrical portion 121d of the rotor 120, to support the cylindrical portion 121d of the rotor 120 coaxially and rotatably with respect to the nut 212.

An anti-rotation groove 212b is provided axially and for a predetermined length in the outer circumferential surface of the nut 212. A projection 6a provided on the mount 6 is inserted slidably into the anti-rotation groove 212b. Therefore, the nut 212 is movable only in the axial direction and is non-rotatable with respect to the mount 6. Also, the anti-rotation groove 212b has two ends which function as mechanical stoppers to limit the axial position of the nut 212.

The gap changing motor 220 is fixed to unillustrated portion of the vehicle body, and has an output shaft 221 provided with a gear 222 fixed thereto. The gear 222 engages with the gear 213 of the threaded cylindrical body 211. Therefore, when electric power is supplied to the gap changing motor 220 and the output shaft 221 rotates, the threaded cylindrical body 211 rotates. In this movement, since the nut 212 is non-rotatable with respect to the mount 6, the rotating movement of the threaded cylindrical body 211 is converted to an axial movement of the nut 212. Therefore, the rotor 120 which is rotatably supported by the nut 212 is moved in the axial direction. For this reason, it is possible to adjust the gap length GAP, which is the length of an air gap between the stator 110 and the rotor 120 (a space between the teeth 112 and the magnet 122 opposed in parallel or substantially parallel to each other), by controlling the gap changing motor 220. FIG. 2 shows a state where the gap length GAP is at its minimum. FIG. 3 shows a state where the gap length GAP is at its maximum, with the nut 212 raised with respect to the mount 6.

The rotor yoke 121, the magnet 122, the teeth 112 and the stator yoke 111 in the wheel drive motor 100 define a magnetic path, and the air gap is arranged within the magnetic path. Since the air gap functions as a magnetic resistance provided in the magnetic path, changing the gap length GAP changes the amount of magnetic flux which flows through the air gap, thereby changing the output characteristic (rotation speed-torque characteristic) of the wheel drive motor 100. Namely, as shown in an example in FIG. 28, the shorter the gap length GAP, the more toward the high-torque low-rotation-speed characteristic (Characteristic 1); and the longer the gap length GAP becomes, the more toward the low-torque high-rotation-speed characteristic (Characteristic 3). Therefore, by controlling the gap length GAP, it becomes possible to use a wide operation range from a high-torque low-rotation-speed to a low-torque high-rotation-speed.

The gap length detector 230, which detects an axial position (in the axial direction of the motor rotation shaft 123) of the rotor 120, in order to detect the gap length GAP, includes an encoder 231 which detects a rotation speed of the threaded cylindrical body 211, and an origin-position sensor 232 which detects an origin position of the nut 212. The encoder 231 includes a plurality of magnets 231a disposed equidistantly in a circular manner on a ring-shaped stepped portion of the threaded cylindrical body 211 where the gear 213 is provided, and a magnetic sensor 231b provided at a position facing the magnets 231a. The magnetic sensor 231b includes two hole effect ICs. These hole effect ICs are provided at a predetermined circumferential space from each other on a substrate 233 fixed to a portion of the vehicle body, and output pulse signals which have a 90-degree phase difference when the threaded cylindrical body 211 rotates. Therefore, by detecting these pulse signals, it is possible to detect an angle of rotation of the threaded cylindrical body 211 as well as the direction of rotation. The origin-position sensor 232 includes a magnet 232a provided at an end of the nut 212, and a magnetic sensor 232b provided in the substrate 233. When the nut 212 moves to the position which minimizes the gap length, the magnetic sensor 232b comes close enough to the magnet 232a and outputs an origin position detection signal. The magnetic sensor 232b is provided by a hole effect IC.

Figure 6:
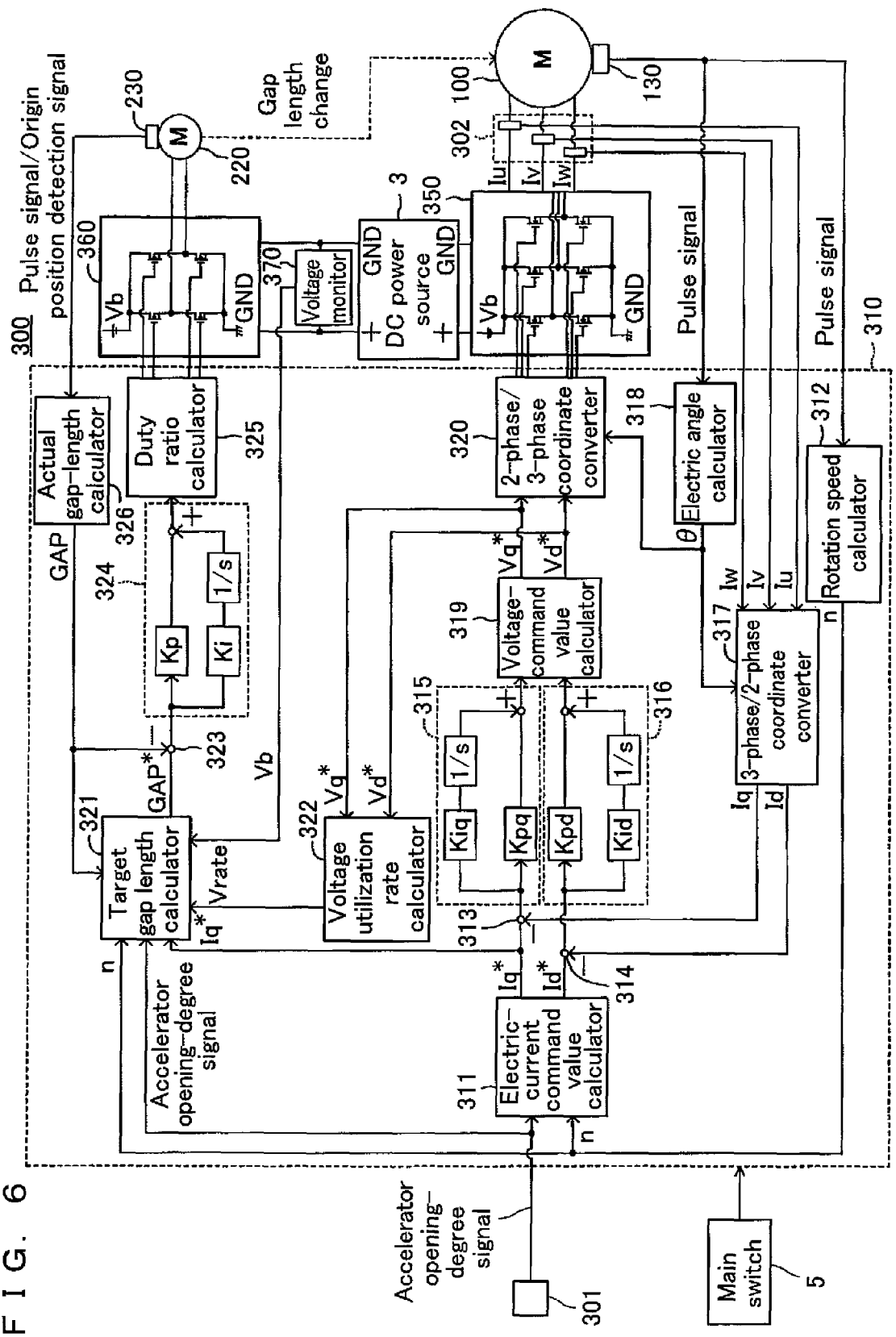
FIG. 6 is a system configuration diagram showing a motor control unit, etc., in the first preferred embodiment of the present invention.

As shown in FIG. 6, the wheel drive motor 100 is also provided with an encoder 130 which outputs a pulse signal in accordance with the motor's number of revolutions. The encoder 130 includes a plurality (three, in the present preferred embodiment) of hole effect ICs. The stator 110 is provided with a plurality (eighteen, in the present preferred embodiment) of teeth 112 as described, and the hole effect ICs are provided within three gaps (each between two mutually adjacent teeth) in four consecutive teeth 112. As the rotor 120 rotates and an N pole or an S pole of the magnet 122 passes across the hole effect ICs, the hole effect IC's output level is reversed. In other words, the three hole effect ICs switch their output signal level between LOW level and HIGH level each time the three phase electricity in the wheel drive motor 100, i.e., Phase U, Phase V and Phase W, make their advances by an electric angle of 180 degrees, thereby outputting pulse signals while the wheel drive motor 100 is rotating. From these pulse signals outputted by the encoder 130, it is possible to detect an electric angle, rotation speed and rotation angle, etc. of the wheel drive motor 100. Further, by differentiating the rotation speed (the amount of revolutions per unit time) of the wheel drive motor 100 by time, it is also possible to detect rotational acceleration (angular acceleration).

Next, description will be made of a control system which controls the wheel drive motor 100 and the gap changing motor 220, with reference to FIG. 6.

The wheel drive motor 100 and the gap changing motor 220 are controlled by the motor control unit 300. The motor control unit 300 includes an electronic controller 310 provided primarily by a microcomputer which has a CPU, a ROM, a RAM, etc.; an inverter circuit 350 as a motor driving circuit which supplies electric power to the wheel drive motor 100 in accordance with commands from the electronic controller 310; an H bridge circuit 360 as a motor driving circuit which supplies electric power to the gap changing motor 220 in accordance with commands from the electronic controller 310; and a voltage monitor circuit 370 which monitors a power source voltage Vb of the DC power source 3. It should be noted here that FIG. 6 is a functional block diagram which shows components of the electronic controller 310 categorized by function. Processes are performed when control programs for the microcomputer to be described below are executed by the electronic controller 310.

The electronic controller 310 is connected with the main switch 5; an accelerator operation-amount sensor 301; the encoder 130; electric current sensors 302 which measure an electric current of the three phases (Phase U, Phase V, Phase W) flowing through the wheel drive motor 100; the gap length detector 230 of the gap changer 200; and the voltage monitor circuit 370, via an unillustrated input interface.

The accelerator operation-amount sensor 301 outputs an accelerator opening-degree signal in accordance with the amount of operation made to the accelerator 4 by a human operator, as accelerator information, to the electronic controller 310. In the present preferred embodiment, the accelerator operation-amount sensor 301 includes a variable resistor which varies electric resistance value in accordance with the operation made to the accelerator 4, and outputs a voltage across the variable resistor as the accelerator opening-degree signal.

The electronic controller 310 includes an electric-current command value calculator 311. The electric-current command value calculator 311 calculates an accelerator opening-degree AO based on the accelerator opening-degree signal from the accelerator operation-amount sensor 301. The accelerator opening-degree AO is a ratio of an actual amount of accelerator operation to a maximum value of the amount of accelerator operation, i.e., a ratio of the accelerator opening-degree signal which is obtained by the accelerator operation-amount sensor 301 to a maximum possible value of the accelerator opening-degree signal.

With the above-described arrangement, the electric-current command value calculator 311 calculates an electric-current command value (target electric-current value) for driving the wheel drive motor 100, based on the accelerator opening-degree AO and the rotation speed n of the wheel drive motor 100 from the rotation speed calculator 312. The rotation speed calculator 312 calculates the rotation speed n of the wheel drive motor 100 based on the pulse signal from the encoder 130.

The electronic controller 310 supplies the wheel drive motor 100, eventually, with sin wave electric power composed of three phases (Phase U, Phase V, Phase W) which have a 120-degree electric-angle phase difference from one phase to another. Also, the electronic controller 310 performs a power supply control in a two-phase d-q axis coordinate system. In other words, a feedback control is provided using the d-q axis coordinate system in which the d axis represents the direction of magnetization of the magnet 122 and the q axis represents a direction which is perpendicular to the d axis. Based on this system, the feedback control is performed to a q-axis current which is an electric component that generates torque and a d-axis current which is an electric component that reduces induced voltage.

The electric-current command value calculator 311 calculates an electric-current command value in the d-q axis coordinate system. A q-axis electric-current command value Iq* is calculated by multiplying an upper limit current value Iqmax by an accelerator opening-degree AO (Iqmax×AO/100). A d-axis electric-current command value Id* is obtained from a calculation using at least one of the accelerator opening-degree AO, the rotation speed n of the wheel drive motor 100 and the q-axis electric-current command value Iq*, as parameter information.

For example, the upper limit current value Idmax is multiplied by the accelerator opening-degree AO to obtain the d-axis electric-current command value Id* (Idmax×AO/100). Another example is to use the rotation speed n of the wheel drive motor 100 as the parameter information. In this case, optimum values of the Id* corresponding to various values of the rotation speed n are obtained in advance through experiments, for example, and are stored in the form of map data in the ROM, and the d-axis electric-current command value Id* is obtained from the map data, for a given rotation speed n of the wheel drive motor 100. As still another example, optimum values of the Id* corresponding to parameter information of the q-axis electric-current command value Iq* may be obtained in advance through experiments, for example, and be stored in the form of map data in the ROM, so that the d-axis electric-current command value Id* is obtained from the map data, for a given q-axis electric-current command value Iq*. Also, optimum values of the Id* corresponding to parameter information of the accelerator opening-degree AO and the q-axis electric-current command value Iq* may be obtained in advance through experiments, for example, and be stored in the form of three-dimensional map data in the ROM, so that the d-axis electric-current command value Id* is obtained from the three-dimensional map data, for a given accelerator opening-degree AO and q-axis electric-current command value Iq*. It should be noted here that the d-axis electric-current command value Id* may be set to zero (Id*=0) constantly, regardless of the above-described accelerator opening-degree AO, the rotation speed n of the wheel drive motor 100 or the q-axis electric-current command value Iq* information.

Figure 7:
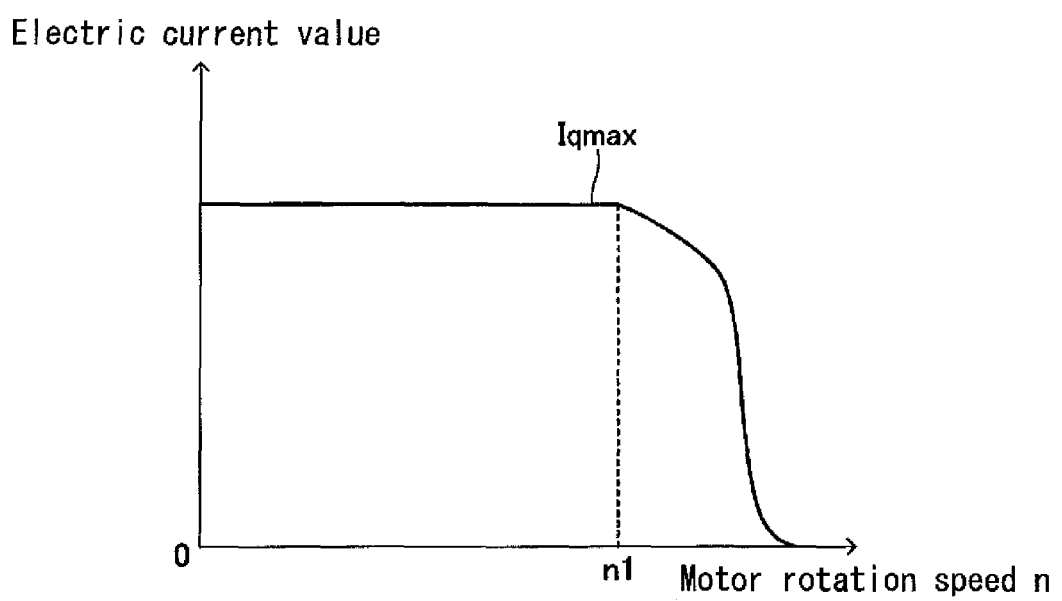
FIG. 7 is a graph showing a reference map for setting an upper limit current value according to the first preferred embodiment of the present invention.

The upper limit current value Iqmax is set in accordance with the rotation speed n of the wheel drive motor 100, by using a reference map shown in FIG. 7. As shown in the reference map, the upper limit current value Iqmax is set to a constant value when the rotation speed n of the wheel drive motor 100 is not greater than a predetermined rotation speed n1, but when the rotation speed n of the wheel drive motor 100 exceeds the predetermined rotation speed n1, the value Iqmax is decreased following the increase in the rotation speed n. Therefore, the electric-current command value calculator 311 calculates the q-axis electric-current command value Iq* based on the accelerator opening-degree AO obtained by the accelerator operation-amount sensor 301 and the rotation speed n of the wheel drive motor 100 obtained by the rotation speed calculator 312.

It should be noted here that the upper limit current value Iqmax may be set to a constant value not only when the rotation speed n of the wheel drive motor 100 is not greater than a predetermined rotation speed n1 but also when the rotation speed n is greater than the predetermined rotation speed n1, instead of using the reference map characteristic shown in FIG. 7.

The upper limit current value Idmax is obtained as a value which satisfies the following mathematical expression (1) for example:

$$I\text{max} > \sqrt{Iq\text{max}^2 + Id\text{max}^2} \quad (1)$$

Imax is a predetermined, maximum allowable current for the switching devices in the inverter circuit 350.

The electric-current command value calculator 311 outputs the q-axis electric-current command value Iq* to a q-axis difference calculator 313, and the d-axis electric-current command value Id* to a d-axis difference calculator 314 respectively. The q-axis difference calculator 313 calculates a difference value (Iq*−Iq) in the d-q axis coordinate system, i.e., a difference between the actual q-axis current value Iq which has passed through the wheel drive motor 100 and the q-axis electric-current command value Iq*, and outputs the obtained difference value to a q-axis proportional item integral calculator 315. Also, the d-axis difference calculator 314 calculates a difference value (Id*−Id) in the d-q axis coordinate system, i.e., a difference between the actual d-axis current value Id which has passed through the wheel drive motor 100 and the d-axis electric-current command value Id*, and outputs the calculated difference value to the d-axis proportional item integral calculator 316.

In this case, calculation of the actual q-axis current value Iq and the actual d-axis current value Id is performed through conversion of the actual three-phase current values (Iu, Iv, Iw) which are measured by the electric current sensor 302 into values on the d-q axis coordinate system by a three-phase/two-phase coordination system converter 317. It should be noted here that in order to convert the three-phase coordination system into the d-q axis coordinate system, the three-phase/two-phase coordination system converter 317 uses an electric angle θ as electric angle information, which is a value calculated by an electric angle calculator 318. The electric angle calculator 318 calculates the electric angle θ of the wheel drive motor 100 based on the pulse signal outputted from the encoder 130 which detects rotation of the wheel drive motor 100.

The q-axis proportional item integral calculator 315 performs proportional item integral calculation based on the difference value (Iq*−Iq), and gives a control amount which will make the actual q-axis current value Iq follow the q-axis electric-current command value Iq*. Likewise, the d-axis proportional item integral calculator 316 performs proportional item integral calculation based on the difference value (Id*−Id), and gives a control amount which will make the actual d-axis current value Id follow the d-axis electric-current command value Id*. The control amounts thus calculated are outputted to a voltage-command value calculator 319, and converted into a q-axis voltage-command value Vq* and a d-axis voltage-command value Vd* in the voltage-command value calculator 319.

The q-axis voltage-command value Vq* and the d-axis voltage-command value Vd* are outputted to a two-phase/three-phase coordination system converter 320. Using the electric angle θ calculated by the electric angle calculator 318, the two-phase/three-phase coordination system converter 320 converts the q-axis voltage-command value Vq* and the d-axis voltage-command value Vd* into three-phase voltage-command values Vu*, Vv*, Vw*, and outputs duty control signals (PWM control signals) in accordance with these voltage-command values Vu*, Vv*, Vw* to the inverter circuit 350.

The inverter circuit 350, which is placed between a positive terminal and a ground terminal of the DC power source 3, is a three-phase bridge circuit including six switching devices provided by, for example, MOSFETs. Each switching device has its gate supplied with the duty control signal. The inverter circuit 350 turns on and off each of the switching devices according to the duty ratio given by the duty control signals, and supplies the wheel drive motor 100 with driving electric power at a voltage in accordance with the voltage-command values Vu*, Vv*, Vw*.

As described, in the power application control of the wheel drive motor 100, the electric-current command value (Iq*, Id*) is set in accordance with the amount of accelerator operation, i.e., the accelerator opening-degree AO in the d-q axis coordinate system, and to this value, the actual current (Iq, Id) which has actually passed through the wheel drive motor 100 is fed back for calculation of the voltage-command value (Vq*, Vd*), and then, duty control of the inverter circuit 350 is performed using the voltage-command values (Vq*, Vd*).

Next, a control system of the gap changing motor 220 in the electronic controller 310 will be described. It should be noted here that control processes for the gap changing motor 220 will be described below in detail with reference to flow charts. Therefore, only a brief description will be given here as to the functional configuration in the electronic controller 310.

The electronic controller 310 includes a target gap length calculator 321; a voltage utilization rate calculator 322; a difference calculator 323; a proportional item integral calculator 324; a duty ratio calculator 325; and an actual gap-length calculator 326. The target gap length calculator 321 is supplied with the accelerator opening-degree signal obtained by the accelerator operation-amount sensor 301; the rotation speed n of the wheel drive motor 100 calculated by the rotation speed calculator 312; the q-axis electric-current command value Iq* calculated by the electric-current command value calculator 311; the power source voltage Vb of the DC power source 3 detected by the voltage monitor circuit 370; the voltage utilization rate Vrate calculated by the voltage utilization rate calculator 322; and the actual gap-length GAP calculated by the actual gap-length calculator 326. Based on these input data, the target gap length calculator 321 calculates a target gap length GAP* which is a target value for the gap length in the gap changing motor 220, and outputs the value to the difference calculator 323.

The difference calculator 323 calculates a difference value (GAP*−GAP) which is a difference between the target gap length GAP* and the actual gap-length GAP calculated by the actual gap-length calculator 326, and outputs the value to the proportional item integral calculator 324. Based on the difference value (GAP*−GAP), the proportional item integral calculator 324 performs proportional item integral calculation to give a control amount which will make the actual gap-length GAP follow the target gap length GAP*. The duty ratio calculator 325 outputs a duty ratio signal in accordance with the calculation result to an H bridge circuit 360.

The H bridge circuit 360, which is placed between the positive terminal and the ground terminal of the DC power source 3, is a bridge circuit including four switching devices provided by, for example, MOSFETs. Each switching device has its gate supplied with the duty control signal. The H bridge circuit 360 turns on and off each of the switching devices according to the duty ratio given by the duty control signals, and supplies the gap changing motor 220 with driving electric power at a voltage in accordance with the duty ratio. Also, the H bridge circuit 360 switches the direction of rotation of the gap changing motor 220 from normal rotation to reverse rotation or vise versa in accordance with the direction of the applied electricity.

The actual gap-length calculator 326 calculates the actual gap-length GAP, which is an actual gap length, based on the pulse signal and the origin position detection signal from the gap length detector 230 (the encoder 231 and the origin-position sensor 232) of the gap changer 200, and outputs the calculation result to the target gap length calculator 321.

The voltage utilization rate calculator 322 calculates a voltage utilization rate Vrate based on the q-axis voltage-command value Vq* and the d-axis voltage-command value Vd* calculated by the voltage-command value calculator 319, and outputs the calculation results to the target gap length calculator 321.

Here, description will be made of the voltage utilization rate. In the present preferred embodiment, a limit to the amount of power application to the wheel drive motor 100 is calculated on the basis of the d-q axis coordinate system and therefore, the voltage control command value is given as the q-axis voltage-command value Vq* and the d-axis voltage-command value Vd* on the d-q axis coordinate system. In this case, a combined vector of the q-axis voltage-command value Vq* and the d-axis voltage-command value Vd* represents the voltage-command value Vc. Therefore, the voltage-command value Vc is expressed by the following mathematical expression (2), i.e., as a square root of a sum of the q-axis voltage-command value Vq* raised to the second power (Vq*²) and the d-axis voltage-command value Vd* raised to the second power (Vd*²):

$$Vc = \sqrt{Vq^{*2} + Vd^{*2}} \qquad (2)$$

This voltage-command value Vc is used as an amplitude value of the control voltage.

As shown in the following mathematical expression (3), the voltage utilization rate Vrate is a ratio of the actually calculated voltage-command value Vc to a maximum control voltage command value (hereinafter called "maximum control voltage command value") Vcmax for driving the wheel drive motor 100:

$$Vrate = \frac{Vc}{Vcmax} \qquad (3)$$

Generally, when performing a PWM control to the inverter circuit 350, a duty ratio is set based on a carrier wave W1 and a modulation wave W2 as shown in FIG. 8, from a magnitude correlation between the two waves. In other words, the duty ratio is set on the basis of a time ratio between a time for which the modulation wave W2 is higher than the carrier wave W1 and a time for which the modulation wave W2 is lower than the carrier wave W1. In the present example, a maximum wave height value of the carrier wave W1 is identical with a maximum wave height value of the modulation wave W2 and thus, when the modulation wave W2 attains the maximum wave height value of the carrier wave W1, the switching devices in the inverter circuit 350 is controlled substantially at 100% duty ratio. Therefore, the maximum control voltage command value Vcmax is set to the maximum wave height value of the modulation wave W2. It should be noted here that although the present example uses a case where the maximum wave height value of the carrier wave W1 is identical with the maximum wave height value of the modulation wave W2, these may not necessarily be identical with each other. Also, the modulation wave W2 shown in FIG. 8 may have at least one of its cycle period and amplitude be increased or decreased with respect to the values shown in FIG. 8.

In the present preferred embodiment, the accelerator operation-amount sensor 301 and the electric-current command value calculator 311 function as an accelerator information obtaining device. The electric-current command value calculator 311, the q-axis difference calculator 313, the d-axis difference calculator 314, the q-axis proportional item integral calculator 315, the d-axis proportional item integral calculator 316 and the voltage-command value calculator 319 function as a voltage calculation device. The voltage utilization rate calculator 322 functions as a voltage utilization rate calculation device. The target gap length calculator 321, the difference calculator 323, the proportional item integral calculator 324, the duty ratio calculator 325 and the H bridge circuit 360 function as a gap controller. The target gap length calculator 321 functions as an angular acceleration information obtaining device, the threshold value setting device and motor stoppage detector. The encoder 130 and the rotation speed calculator 312 function as a rotation speed information obtaining device. The electric-current command value calculator 311 represents an electric-current command value calculation device. The voltage monitor circuit 370 represents a voltage information obtaining device. The gap length detector 230 and the actual gap-length calculator 326 function as a gap length detector.

Figure 9:
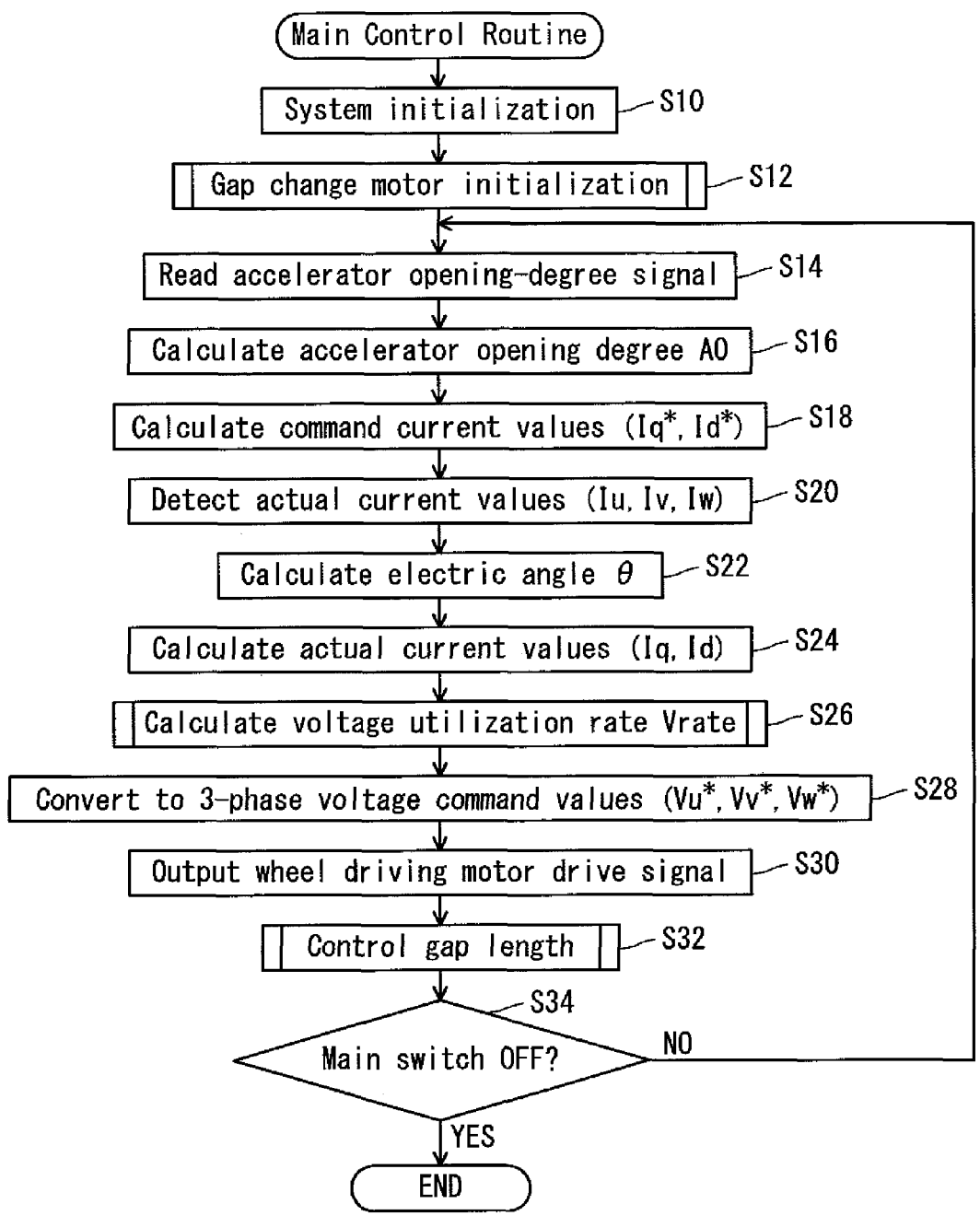
FIG. 9 is a flowchart showing a wheel driving main control routine in the first preferred embodiment of the present invention.

Next, description will be made for a wheel driving control process performed by the electronic controller 310, with reference to a flowchart in FIG. 9. FIG. 9 shows a wheel drive main control routine. The wheel drive main control routine is stored in the ROM in the electronic controller 310 as a control program. The wheel drive main control routine includes not only a driving control process of the wheel drive motor 100 but also a control process of the gap length by the gap changer 200.

Figure 10:
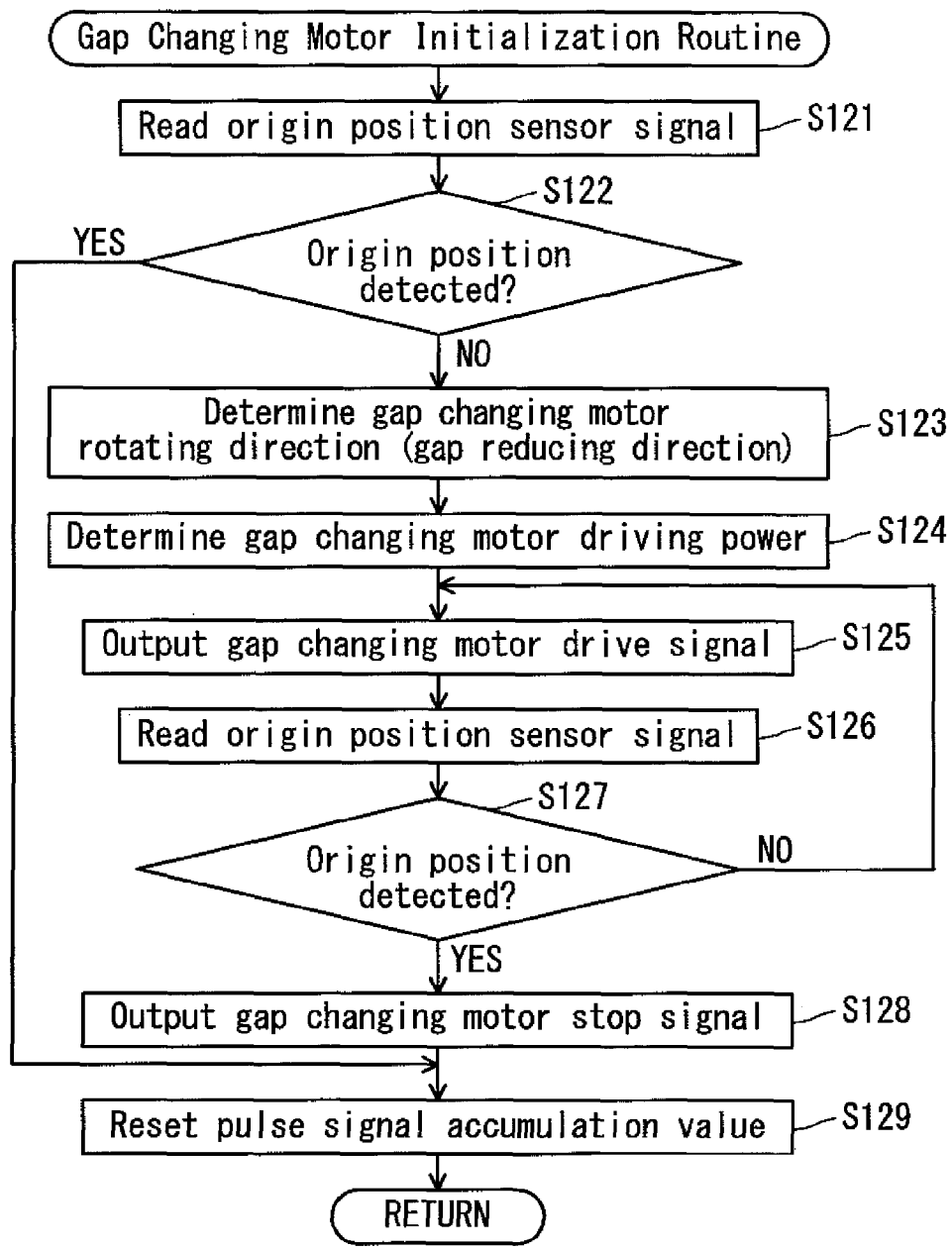
FIG. 10 is a flowchart showing a gap changing motor initialization routine in the first preferred embodiment of the present invention.

The main control routine starts when the main switch 5 provided in the electric bike 1 is turned on. When the main control routine starts, the electronic controller 310 first initializes the overall system of the motor control unit 300 in Step S10. For example, the microcomputer is initialized and initial diagnosis is performed to check if there is any abnormality in the system. Subsequently, the electronic controller 310 initializes the gap changing motor 220 in Step S12. This process performed in Step S12 will now be described with reference to a flowchart in FIG. 10. FIG. 10 shows a subroutine as the gap changing motor initialization process.

In the gap changing motor initialization routine, the electronic controller 310 first reads a signal from the origin-position sensor 232 of the gap length detector 230 in Step S121. Subsequently, in Step S122, a determination is made whether or not the signal read from the origin-position sensor 232 is an origin position detection signal. The origin-position sensor 232 outputs an origin position detection signal when the rotor 120 is at a position where the gap length GAP takes its minimum value. Therefore, if the rotor 120 is at the position to give the minimum gap length, the determination made by the electronic controller 310 in Step S122 is "Yes" and the process moves to Step S129. On the other hand, if the rotor 120 is not at the point to give the minimum gap length, the determination in Step S122 is "No", and the process moves to Step S123.

First, description will be made for a process starting from Step S123. In Step S123, the electronic controller 310 determines that the rotating direction of the gap changing motor 220 should be a direction which will decrease the air gap. Next, in Step S124, a driving power of the gap changing motor 220 is determined. The driving power is set to a predetermined initialization value.

Subsequently, in Step S125, the electronic controller 310 outputs a drive signal (duty control signal) in accordance with the above-determined rotating direction and the drive power, to the H bridge circuit 360, and drives the gap changing motor 220. Next, in Step S126, a signal from the origin-position sensor 232 of the gap length detector 230 is read, and in Step S127 a determination is made whether or not an origin position detection signal has been outputted from the origin-position sensor 232. The electronic controller 310 repeats the process in Steps S125 through S127 until an origin position detection signal has been detected. Then, upon detection of the origin position detection signal (S127: Yes), a power application stop signal is outputted to the H bridge circuit 360 in Step S128 to stop the operation of the gap changing motor 220.

When the process in Step S128 is finished, or if Step S122 has determined that the rotor 120 is already at the position to give the minimum gap length, Step S129 is performed to reset an accumulated count of the number of pulse signals outputted from the encoder 231 of the gap length detector 230, to zero. Therefore, after the process in Step S129 has been performed, it is possible to detect the axial position of the rotor 120, i.e., the gap length, by counting the pulse signals (performing addition or subtraction depending on the rotating direction) outputted from the encoder 231. After finishing the process in Step S129, the process leaves this subroutine, and proceeds to perform a process in Step S14 of the main control routine.

Now, description will go back to the main control routine shown in FIG. 9.

In Step S14, the electronic controller 310 reads an accelerator opening-degree signal from the accelerator operation-amount sensor 301. Subsequently, in Step S16, the electronic controller 310 calculates an accelerator opening-degree AO based on the accelerator opening-degree signal. The accelerator opening-degree AO is calculated by dividing the accelerator opening-degree signal from the accelerator operation-amount sensor 301 by a maximum value of the accelerator opening-degree signal. In Step S18, the electronic controller 310 calculates a q-axis electric-current command value Iq* and a d-axis electric-current command value Id* for driving the wheel drive motor 100. In other words, the electronic controller 310 calculates a q-axis electric-current command value Iq* by multiplying an upper limit current value Iqmax, which is a value set in accordance with the rotation speed n of the wheel drive motor 100 by an accelerator opening-degree AO. Also, the electronic controller 310 calculates a d-axis electric-current command value Id*, using at least one of the accelerator opening-degree AO, the rotation speed n of the wheel drive motor 100 and the q-axis electric-current command value Iq* as parameter information. The above-described process in Steps S14 through S18 is a process performed by the electric-current command value calculator 311.

In Step S20, the electronic controller 310 detects actual current values (Iu, Iv, Iw) of the current flowing through the wheel drive motor 100 by using the electric current sensor 302. Next, in Step S22, calculation is made to obtain an electric angle θ of the wheel drive motor 100 based on pulse signals outputted from the encoder 130 which detects rotation of the wheel drive motor 100. The process in Step S22 is a process performed by the electric angle calculator 318.

In Step S24, the electronic controller 310 calculates an actual q-axis current value Iq and an actual d-axis current value Id which are values obtained by converting the three-phase actual current values (Iu, Iv, Iw) into values on the d-q axis coordinate system. The process in Step S24 is a process performed by the three-phase/two-phase coordination system converter 317.

Figure 11:
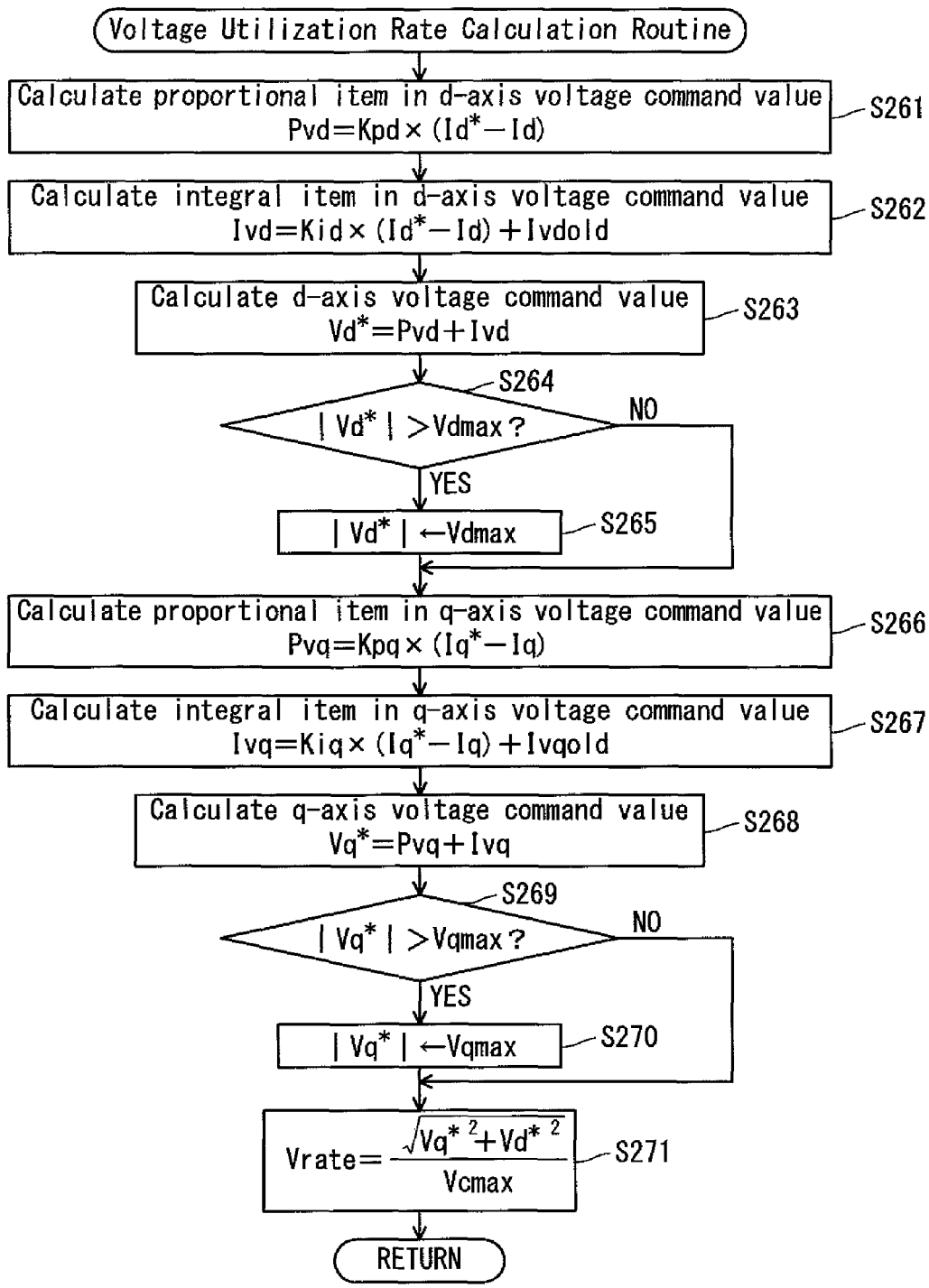
FIG. 11 is a flowchart showing a voltage utilization rate calculation routine in the first preferred embodiment of the present invention.

In Step S26, the electronic controller 310 performs a calculation process of the voltage utilization rate Vrate. The process in Step S26 will be described with reference to a flowchart shown in FIG. 11. FIG. 11 shows a subroutine as the voltage utilization rate calculation process.

In the voltage utilization rate calculation routine, first, Step S261 is performed to calculate a proportional item Pvd of the d-axis voltage-command value. The proportional item Pvd of the d-axis voltage-command value is obtained by the following mathematical expression (4), by first obtaining a difference value (Id*−Id) between the d-axis electric-current command value Id* and the actual d-axis current value Id, and then multiplying the obtained value by a coefficient Kpd:

$$Pvd=Kpd\times(Id^*-Id) \tag{4}$$

Next, in Step S262, calculation is made to obtain an integral item Ivd of the d-axis voltage-command value. The integral item Ivd of the d-axis voltage-command value is obtained by the following mathematical expression (5), by first obtaining a difference value (Id*−Id) between the d-axis electric-current command value Id* and the actual d-axis current value Id, then multiplying the obtained value by a coefficient Kid, and then adding a previous integral item value Ivdold to the obtained value:

$$Ivd=Kid\times(Id^*-Id)+Ivdold \tag{5}$$

The voltage utilization rate calculation routine is a part of the main control routine and is repeated periodically in a predetermined interval. Therefore, the previous value Ivdold is a value of the integral item Ivd calculated in the previous cycle.

Next, in Step S263, the d-axis voltage-command value Vd* is calculated. The d-axis voltage-command value Vd* is obtained by adding the proportional item Pvd to the integral item Ivd (Vd*=Pvd+Ivd).

Then, in Step S264, the process determines whether or not an absolute value |vd*| of the d-axis voltage-command value Vd* is greater than a predetermined upper limit value Vdmax. If the value is greater than the upper limit value Vdmax (S264: Yes), then Step S265 is performed to put an upper-limit value limitation on the d-axis voltage-command value Vd* so that its absolute value is equal to the upper limit value Vdmax. On the other hand, if the absolute value |Vd*| of the d-axis voltage-command value Vd* is not greater than the upper limit value Vdmax (S264: No), Step S265 is skipped.

Next, in Step S266, the electronic controller 310 calculates a proportional item Pvq of the q-axis voltage-command value. The proportional item Pvq of the q-axis voltage-command value is obtained by the following mathematical expression (6), by first obtaining a difference value (Iq*−Iq) between the q-axis electric-current command value Iq* and the actual q-axis current value Iq, and then multiplying the obtained value by a coefficient Kpq:

$$Pvq=Kpq\times(Iq^*-Iq) \tag{6}$$

Next, in Step S267, the integral item Ivq of the q-axis voltage-command value is calculated. The integral item Ivq of the q-axis voltage-command value is obtained by the following mathematical expression (7), by first obtaining a difference value (Iq*−Iq) between the q-axis electric-current command value Iq* and the actual q-axis current value Iq, then multiplying the obtained value by a coefficient Kiq, and then adding the obtained value to a previous value Ivqold of the integral item:

$$Ivq=Kiq\times(Iq^*-Iq)+Ivqold \tag{7}$$

Then, in Step S268, the q-axis voltage-command value Vq* is calculated. The q-axis voltage-command value Vq* is obtained by adding the proportional item Pvq and the integral item Ivq (Vq*=Pvq+Ivq).

Subsequently, in Step S269, a determination is made whether an absolute value |vq*| of the q-axis voltage-command value Vq* is greater than a predetermined upper limit value Vqmax. If the value is greater than the upper limit value Vqmax (S269: Yes), Step S270 is performed to put an upper-limit value limitation on the q-axis voltage-command value Vq* so that its absolute value |Vq*| is equal to the upper limit value Vqmax. On the other hand, if the absolute value |vq*| of the q-axis voltage-command value Vq* is not greater than the upper limit value Vdmax (S269: No), Step S270 is skipped.

The process in Steps S261 through S270 are a process performed by the above-described d-axis difference calculator 314, the d-axis proportional item integral calculator 316, the q-axis difference calculator 313, the q-axis proportional item integral calculator 315 and the voltage-command value calculator 319.

In Step S271, the electronic controller 310 calculates a voltage utilization rate Vrate. The voltage utilization rate Vrate is calculated by the above-described mathematical expression (3) based on the d-axis voltage-command value Vd* calculated in Step S265, the q-axis voltage-command value Vq* calculated in Step S270, and the maximum voltage-command value Vcmax. After the voltage utilization rate Vrate is calculated, the process leaves this subroutine and proceeds to the process in Step S28 of the main control routine in FIG. 9.

In Step S28 of the main control routine, the electronic controller 310 converts the q-axis voltage-command value Vq* and the d-axis voltage-command value Vd* into three-phase voltage-command values Vu*, Vv*, Vw*. This process is a process performed by the two-phase/three-phase coordination system converter 320. Subsequently, in Step S30, duty control signals (PWM control signals) which are signals in accordance with the voltage-command values Vu*, Vv*, Vw* are outputted to the inverter circuit 350. Therefore, the wheel drive motor 100 is supplied with electric power in accordance with the voltage-command values Vu*, Vv*, Vw*.

In Step S32, the electronic controller 310 performs a gap length control process. Description will now cover the gap length control process in Step S32, with reference to a flowchart shown in FIG. 12. FIG. 12 shows a subroutine as the gap length control process.

In the gap length control routine, the electronic controller 310 first determines in Step S321 whether or not the wheel drive motor 100 is rotating. The determination is made based on whether or not the rotation speed n from the rotation speed calculator 312 has a value of zero. If the wheel drive motor 100 is not rotating (S321: No), the target gap length GAP* is set to the minimum gap length in Step S322. This is to set the output characteristic to a high-torque low-rotation-speed characteristic so that a high torque will be obtained when the wheel drive motor 100 is started. In this case, the setting for the output characteristic is like Characteristic 1 in FIG. 28, for example. The process in Step S321 is a process performed by the target gap length calculator 321.

On the other hand, if the wheel drive motor 100 is rotating (S321: Yes), Step S323 checks whether or not the accelerator opening-degree AO is greater than a predetermined opening-degree A1 (for example, 0.7). If the accelerator opening-degree AO is greater than the opening-degree A1, the process moves to a gap length setting process (which represents the first control mode in the present preferred embodiment) which is based on the voltage utilization rate Vrate and starts from Step S324. On the other hand, if the accelerator opening-degree AO is not greater than the predetermined opening-degree A1, the process proceeds to a gap length setting process (which represents the second control mode in the present preferred embodiment) which is not based on the voltage utilization rate Vrate and starts from Step S328.

First, description will be made for the case where the accelerator opening-degree AO is greater than the predetermined opening-degree A1.

In Step S324, the electronic controller 310 calculates an angular acceleration of the wheel drive motor 100, and sets threshold values R1, R2 based on the angular acceleration. The angular acceleration is obtained from the rotation speed n (the amount of rotation per unit time) of the wheel drive motor 100 which is obtained from a pulse signal string outputted by the encoder 130 provided in the wheel drive motor 100 through differentiation of the value by time. The threshold values R1, R2 are utilized to adjust the gap length in accordance with the voltage utilization rate Vrate as will be explained below in Step S325. The threshold values R1, R2 are set by using a reference map shown in FIG. 13, for example. As shown in the reference map, the threshold values R1, R2 are decreased to smaller values as the angular acceleration increases.

When the output characteristic of the wheel drive motor 100 is changed, there would be no problem if it is possible to increase/decrease the gap length right at the moment as the wheel drive motor 100 makes acceleration/deceleration. However, in reality, it takes time for the gap changing motor 220 to adjust the gap length. The threshold values R1, R2 are provided for this reason, to enable to start the gap changing motor 220 earlier when the angular acceleration of the wheel drive motor 100 is large.

Subsequently, Step S325 determines the size of the voltage utilization rate Vrate. In other words, a determination is made whether or not the voltage utilization rate Vrate is greater than the threshold value R1; smaller than the threshold value R2; or not smaller than the threshold value R2 and not greater than the threshold value R1. The voltage utilization rate Vrate utilized here is the value calculated in Step S271. If the voltage utilization rate Vrate is smaller than the threshold value R2 (Vrate<R2), Step S326 sets the target gap length GAP* to a value which is obtained by subtracting a unit gap length GAP0 from the current target gap length GAPc* (GAP*=GAPc*−GAP0). In other words, the target gap length GAP* is shortened.

If the voltage utilization rate Vrate is greater than the threshold value R1 (Vrate>R1), Step S327 sets the target gap length GAP* to a value which is obtained by adding the unit gap length GAP0 to the current target gap length GAPc* (GAP*=GAPc*+GAP0). In other words, the target gap length GAP* is made longer.

If the voltage utilization rate Vrate is not smaller than the threshold value R2 and not greater than the threshold value R1 (R2≦Vrate≦R1), no setting change is made to the target gap length GAP*, and Step S331 is performed to read pulse signal counting information which is outputted from the encoder 231 of the gap changer 200. The pulse signal outputted from the encoder 231 is counted by an unillustrated counting routine, and a value of the count is read in Step S331. The value of the count is a value obtained by adding or subtracting the number of pulse signals depending on the rotating direction of the gap changing motor 220.

Subsequently, in Step S332, the pulse signal count value is accumulated, and based on the accumulated value, the amount of rotation (total amount of rotation) of the gap changing motor 220 from the origin position is calculated. The amount of rotation of the gap changing motor 220 corresponds to the actual gap-length GAP. The process in Steps S331 through S332 corresponds to the process performed by the actual gap-length calculator 326 in FIG. 6. Next, in Step S333, a stop signal to stop the gap changing motor 220 is outputted to the H bridge circuit 360, and then the process leaves this subroutine for a while.

If Step S323 determines that the accelerator opening-degree AO is not greater than the predetermined opening-degree A1 (AO≦A1), the gap length setting based on the voltage utilization rate Vrate is not performed, but Steps S328 through S330 are performed to set the target gap length GAP*.

Here, description will first cover reasons why the gap length setting based on the voltage utilization rate Vrate is not performed if the accelerator opening-degree AO is not greater than the predetermined opening-degree A1. For example, take a case where the electric bike 1 is decelerated on the run. The driver moves the accelerator 4 to the closing direction and therefore, the accelerator opening-degree AO and the control voltage (voltage-command value Vc) of the wheel drive motor 100 decrease, and thus the voltage utilization rate Vrate decreases. In this moment, the wheel drive motor 100 has an excess in its torque output capacity as compared to the demanded torque. Setting the target gap length GAP* based on the voltage utilization rate Vrate under such a situation will shorten the gap length (see Step S326), resulting in an unfavorable large iron loss. The gap length also affects copper loss in the wheel drive motor 100. For these reasons, in this preferred embodiment, the gap length setting based on the voltage utilization rate Vrate is not performed when the accelerator opening-degree AO is not greater than the predetermined opening-degree A1, but the target gap length GAP* is set as follows so that iron loss and copper loss in the wheel drive motor 100 will be reduced.

First, in Step S328, the electronic controller 310 obtains the power source voltage Vb from the voltage monitor circuit 370. Next, in Step S329, a target gap length setting map appropriate for the obtained power source voltage Vb is selected. FIG. 14 shows an example of such a target gap length setting map. The target gap length setting map allows setting of the target gap length GAP* from two parameters, i.e., the motor rotation speed n and the motor electric-current command value (q-axis electric-current command value Iq*). As the target gap length setting map, a plurality of maps are prepared each for a different characteristic suitable for a given power source voltage Vb. Therefore, in Step S329, one map is selected from a plurality of target gap length setting maps, in accordance with the obtained power source voltage Vb. Subsequently, in Step S330, the target gap length GAP* is set by using the selected target gap length setting map. The process in Steps S321 through S330 corresponds to the process performed by the target gap length calculator 321 in FIG. 6 which has been described above.

Description will now cover the target gap length setting map shown in FIG. 14. In this map, the horizontal axis represents the rotation speed n of the wheel drive motor 100 whereas the vertical axis represents the motor electric-current command value (q-axis electric-current command value Iq*). The map is for setting the target gap length GAP* in order to provide optimum control of iron loss and copper loss in the wheel drive motor 100. In this map, a region on the right side, enclosed by a broken line, is a controllable region Af where motor impedance is taken into account whereas a region on the left side, enclosed by a broken line, is an optimum control region Ac where iron loss and copper loss will be optimized. In the controllable region Af, Lines Lf1 through Lf12 are drawn to indicate borders of the target gap length GAP*. In the optimum control region Ac, Lines Lc1 through Lc8 are drawn to indicate borders of the target gap length GAP*.

Lines Lf1 through Lf12 are border lines indicating the target gap length GAP* of 1 mm, 2 mm, 3 mm, . . . 12 mm, at an increment of 1 mm. Also, the Lines Lc1 through Lc8 are border lines indicating the target gap length GAP* of 1 mm, 2 mm, 3 mm, 0.8 mm for setting, at an interval of 1 mm.

Description will now cover how the target gap length setting map is used in setting the target gap length GAP*. A region enclosed by Line Lf1 and Line Lc1 (a region on the left of Line Lf1 and above Line Lc1) is a 1-mm region where the target gap length GAP* is set to 1 mm. A region enclosed by Line Lf2 and Line Lc2 (a region on the left of Line Lf2 and above Line Lc2) excluding the 1-mm region is a 2-mm region where the target gap length GAP* is set to 2 mm. Likewise, a region enclosed by Line Lf3 and Line Lc3 excluding the 1-mm and the 2-mm regions is a 3-mm region where the target gap length GAP* is set to 3 mm. In other words, a region enclosed by Line Lfn (n=1 through 12) and Line Lcn (n=1 through 8) excluding the 1-mm through (n−1) mm regions is an n-mm region where the target gap length GAP* is set to n mm. For a region where the motor rotation speed n is greater than in the 8-mm region, or for a region where the motor electric-current command value is smaller than in the 8-mm region, the target gap length GAP* is set to a value greater than 8 mm and having a border given by one of Lines Lf8 through Lf12 in the controllable region Af.

Following the target gap length setting map, the target gap length GAP* increases with increase in the rotation speed n of the wheel drive motor 100. Also, the target gap length GAP* increases with decrease in the motor current (q-axis electric-current command value Iq*).

The target gap length setting map is developed in advance, through experiments, for example, by finding optimum gap length setting values which reduce iron loss and copper loss. The optimum gap length in the controllable region Af varies with the power source voltage Vb of the DC power source 3 which serves as a power source for the inverter circuit 350. In the present preferred embodiment, therefore, a plurality of target gap length setting maps each indicating optimum gap length values for a given power source voltage Vb are stored in the ROM. Under such an arrangement, a target gap length setting map appropriate for a given power source voltage Vb is selected in Step S329. In this case, one map is selected from a plurality of target gap length setting maps, and then the target gap length GAP* is obtained based on the selected map. There may be a case where two consecutive maps are selected from a plurality of target gap length setting maps, and the target gap length GAP* is obtained through interpolation of the two maps.

Setting is made as shown in FIG. 15 for example, so that Lines Lf1 through Lf12 are shifted on the higher side of the rotation speed n of the wheel drive motor 100 as the power source voltage Vb becomes higher. In other words, if the same principle is stated from the opposite perspective, setting is made so that lines Lf1 through Lf12 are shifted on the lower side of the rotation speed n of the wheel drive motor 100 as the power source voltage Vb becomes lower. Therefore, the target gap length GAP* setting region shifts to the right or left on the characteristic chart depending on the power source voltage Vb. With this arrangement, a correction is made by shortening the target gap length GAP* as the power source voltage Vb increases, even if the rotation speed n of the wheel drive motor 100 and the motor current (q-axis electric-current command value Iq*) are the same. Likewise, a correction will also be made in the reverse way to make the target gap length GAP* longer when the power source voltage Vb decreases.

Figure 16:
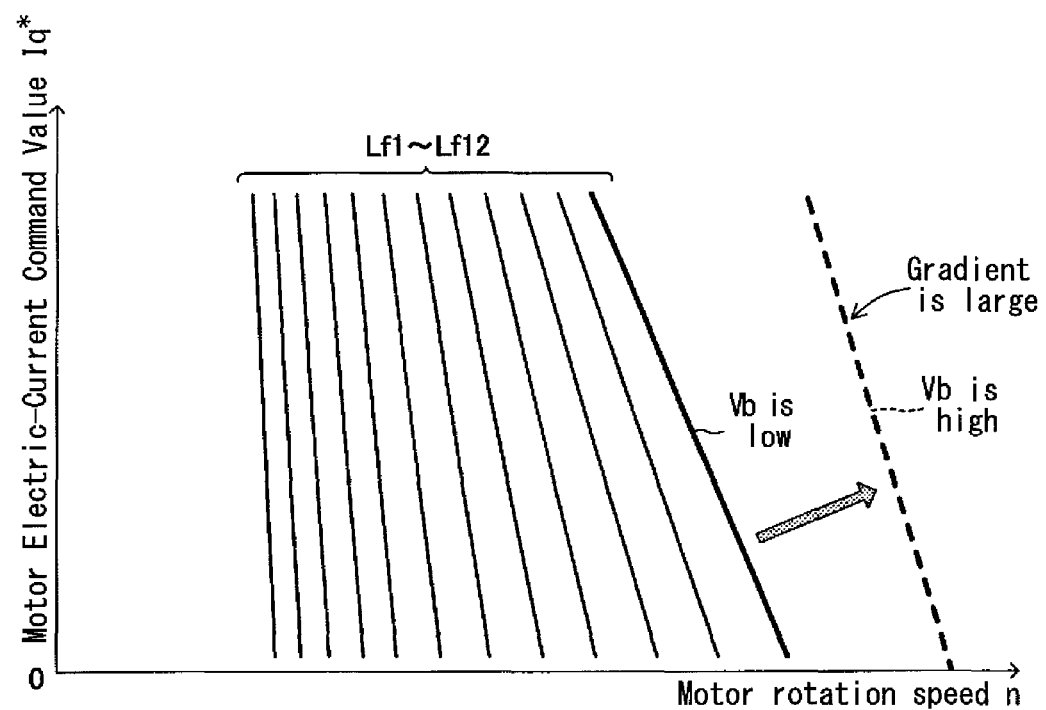
FIG. 16 is a graph showing characteristic changes in the target gap length setting reference map in the first preferred embodiment of the present invention.

Note that in FIG. 15, the gradient of Lines Lf1 through Lf12 in the controllable region Af is decreased with an increase in the power source voltage Vb. However, the gradient of Lines Lf1 through Lf12 may be increased with an increase in the power source voltage Vb as shown in FIG. 16 depending on the motor characteristic. Also, it is not necessary to make a shift or change the gradient in all of the Lines-Lf1 through Lf12. Changes may be made to the characteristic only partially.

Description will now return to the gap length control routine in FIG. 12.

After the process from Steps S321 through S330 and the target gap length GAP* has been set, next, the electronic controller 310 proceeds to Step S334 and reads pulse signal counting information outputted from the encoder 231 of the gap changer 200. Subsequently, in Step S335, the pulse signal count value is accumulated, and based on the accumulated value, the amount of rotation (total amount of rotation) of the gap changing motor 220 from the origin position is calculated. The amount of rotation of the gap changing motor 220 corresponds to the actual gap-length GAP. The process in Steps S334 through S335 is the same as the process in Steps S331 and S332 described above.

Subsequently, in Step S336, the electronic controller 310 calculates a drive power for the gap changing motor 220, i.e., a duty ratio of the duty control signals to be outputted to the H bridge circuit 360. In this case, a proportional item integral calculation is performed based on a difference value (GAP*−GAP), i.e., a difference between the target gap length GAP* calculated in Steps S321 through S330 and the actual gap length GAP calculated in Step S335, and then the duty ratio is set in accordance with the calculation result.

Subsequently, in Step S337, a determination is made whether or not the rotor 120 of the wheel drive motor 100 has reached a position which reaches the target gap, i.e., whether or not the actual gap-length GAP calculated in Step S335 has become equal to the target gap length GAP*.

The process in Steps S336 and S337 corresponds to the process performed by the difference calculator 323, the proportional item integral calculator 324 and the duty ratio calculator 325 in FIG. 6.

If the actual gap-length GAP is equal to the target gap length GAP* (S337: Yes), Step S333 is performed to output a stop signal to the H bridge circuit 360 for stopping the gap changing motor 220, and then the process leaves this subroutine for a while.

On the other hand, if the actual gap-length GAP is not equal to the target gap length GAP* (S337: No), Step S338 determines whether or not the specified rotating direction of the gap changing motor 220 is the direction to decrease the air gap. In other words, the process checks whether or not the target gap length GAP* is smaller than the actual gap-length GAP. If the specified rotating direction of the gap changing motor 220 is the direction to decrease the air gap (S338: Yes), Step S339 is performed to output a duty control signal to the H bridge circuit 360 in a power application direction for decreased air gap, to drive the gap changing motor 220. On the other hand, if the specified rotating direction of the gap changing motor 220 is the direction to increase the air gap (S338: No), Step S340 is performed to output a duty control signal to the H bridge circuit 360 in a power application direction for increased air gap to drive the gap changing motor 220. The duty control signal outputted in Steps S339 and S340 is the duty control signal of the duty ratio which was calculated in Step S336 above.

After outputting the drive signal or stop signal to the H bridge circuit 360, the electronic controller 310 leaves the gap length control routine.

Figure 28:
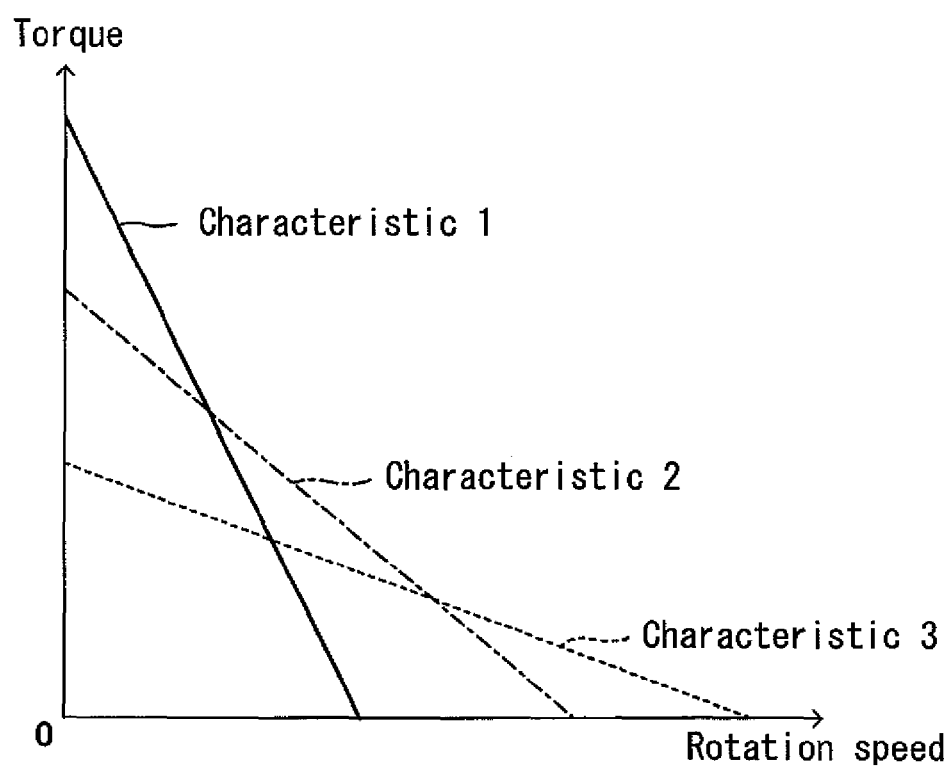
FIG. 28 is an output characteristic chart of an electric motor having different characteristics depending on the gap length.
Figure 29:
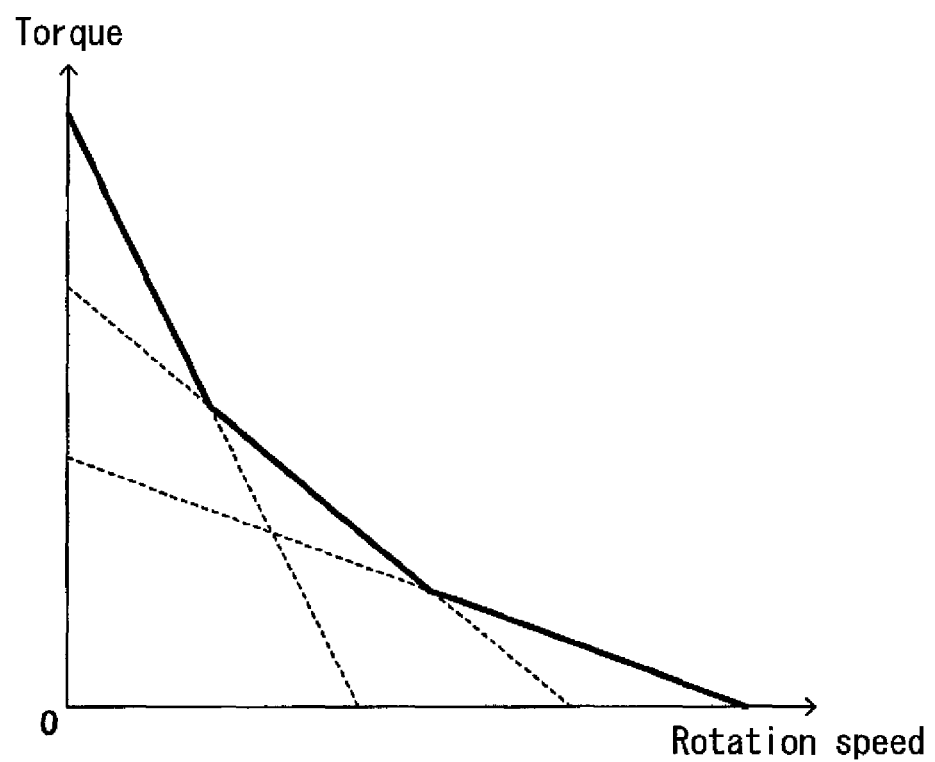
FIG. 29 is an output characteristic chart of the electric motor obtained by changing the gap length.
Figure 32:
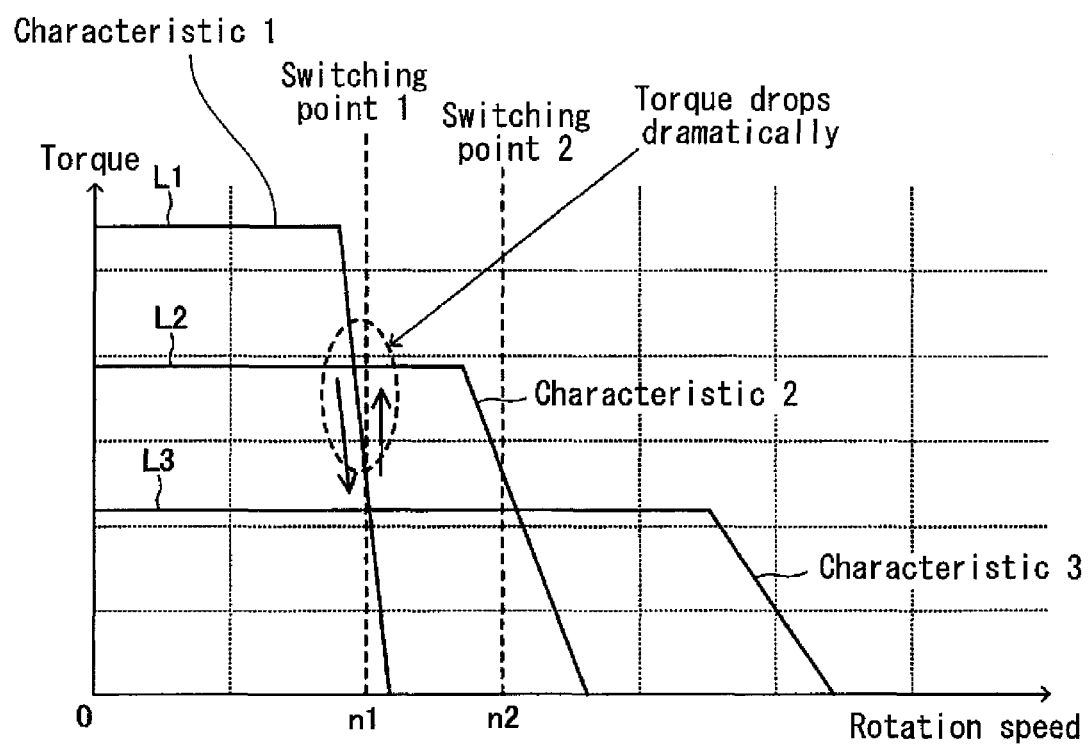
FIG. 32 is an explanatory diagram for describing the output characteristic when the gap length is changed (under a state where torque values are stronger).

According to the gap length control routine, the gap length is adjusted based on the voltage utilization rate Vrate if the accelerator opening-degree AO is greater than the predetermined opening-degree A1. In other words, if the voltage utilization rate Vrate is greater than the threshold value R1, the gap length is made longer (S327), but if the voltage utilization rate Vrate is smaller than the threshold value R2, the gap length is shortened (S326), whereas if the voltage utilization rate Vrate is not smaller than the threshold value R2 and not greater than the threshold value R1, the gap length is not changed (S333). Therefore, it is possible to switch the motor output characteristic among a plurality of settings such as Characteristic 1 through Characteristic 3 as shown in FIG. 28. It should be noted here that FIG. 28 shows only three settings for the sake of easier understanding. However, in the present preferred embodiment, switching is made in a greater number of settings. In this arrangement, the gap length (motor output characteristic) is switched in accordance with the voltage utilization rate Vrate and therefore, and an appropriate switching timing is assured.

If the accelerator opening-degree AO is not greater than the predetermined opening-degree A1, the gap length adjustment based on the voltage utilization rate Vrate is not performed, and the gap length is adjusted on the basis of the target gap length setting map. Therefore, it is possible to reduce iron loss and copper loss in the wheel drive motor 100.

Now, an example of the gap length adjustment which uses a target gap length setting map will be described for a case Of stopping a running electric bike 1.

Figure 17:
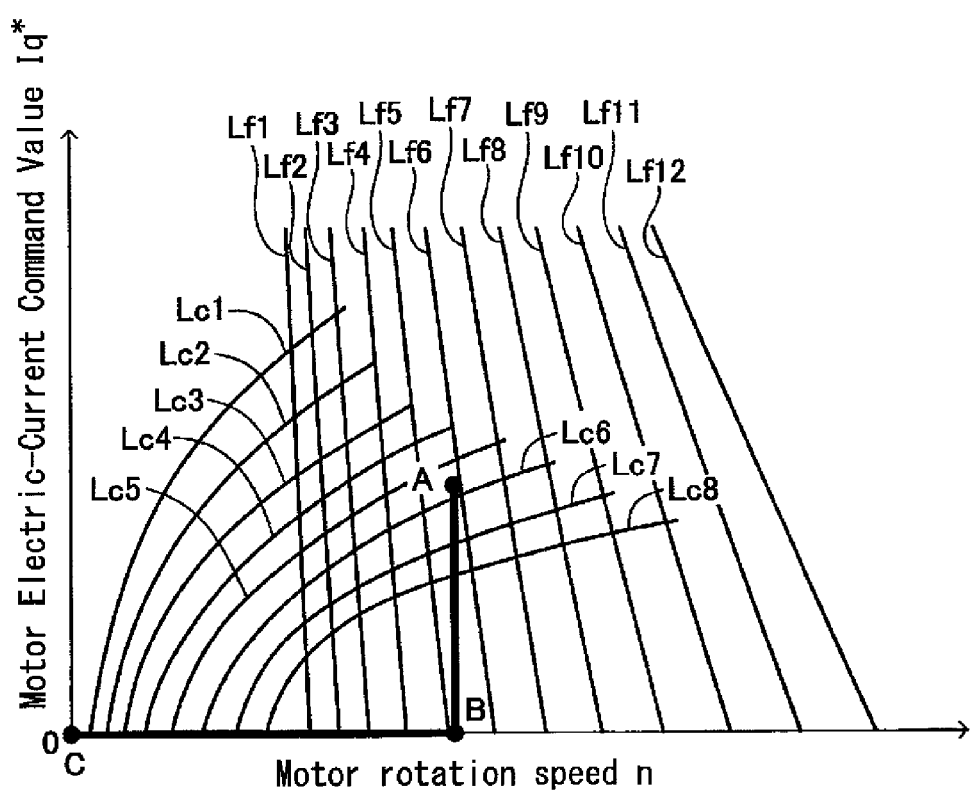
FIG. 17 is a diagram describing that the gap length is adjusted by using the target gap length setting reference map in the first preferred embodiment of the present invention.

As shown in FIG. 17, assume that the state of control (rotation speed n of the wheel drive motor 100, q-axis electric-current command value Iq*) of the wheel drive motor 100 is at Point A, and then, assume that the accelerator opening-degree AO is reduced to zero. In this instance, the q-axis electric-current command value Iq* decreases to zero, but the wheel drive motor 100 does not stop instantly. Therefore, the target gap length GAP* stays at 9 mm (Point B) for a while. The wheel 2 continues to turn for some time and then stops. Therefore, the relationship between the target gap length GAP* and the rotation speed n of the wheel drive motor 100 shifts from Point B to Point C as the rotation speed n decreases. In this way, the target gap length GAP* increases from the initial 6 mm (Point A) to 9 mm (Point B) for a while, and then decreases to the smallest setting of 1 mm (Point C). Therefore, during the period when the rotation speed n of the wheel drive motor 100 is high, a long target gap length GAP* is set to reduce iron loss and thereafter, the target gap length GAP* is made shorter along with decrease in the rotation speed n of the wheel drive motor 100.

Figure 18:
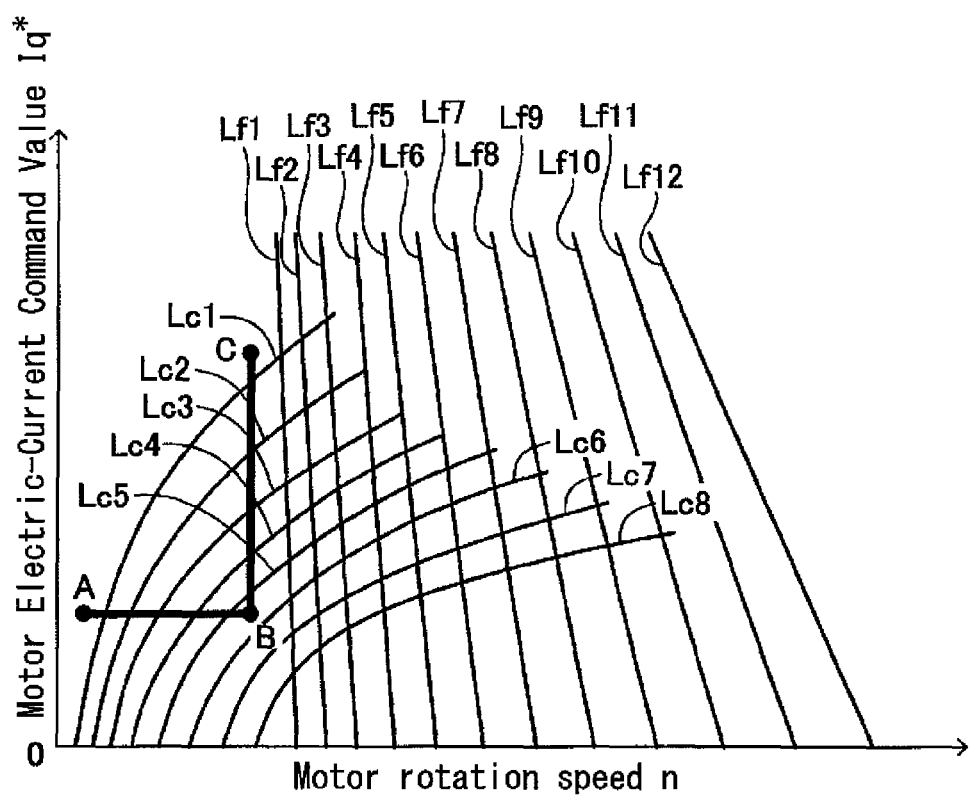
FIG. 18 is a diagram describing that the gap length is adjusted by using the target gap length setting reference map in the first preferred embodiment of the present invention.

Another example will be explained with reference to FIG. 18.

Assume that the state of control (rotation speed n of the wheel drive motor 100, q-axis electric-current command value Iq*) of the wheel drive motor 100 is at Point A. Then, assume that only the rotation speed n of the wheel drive motor 100 increases while the q-axis electric-current command value Iq* is constant. The state of control shifts to Point B. Therefore, the target gap length GAP* which is based on the target gap length setting map is increased from 1 mm (Point A) to 6 mm (Point B). This reduces iron loss. From this state, if the human driver wants a strong torque and increases the accelerator opening-degree AO, then the q-axis electric-current command value Iq* increases. In this instance, the state of control of the wheel drive motor 100 shifts from Point B to Point C. Therefore, the target gap length GAP* which is set by using the target gap length setting map is decreased from 6 mm (Point B) to 1 mm (Point C). The decreased gap length allows the same torque at a lower current value to be obtained. This makes it possible to increase the torque of wheel drive motor 100 without increasing too much in copper loss.

Copper loss is an electric power loss component caused by the electric resistance in the coil. With i being the value of current flowing through the coil, and r being the electric resistance value of the coil, copper loss is expressed as $i^2 \times r$. On the other hand, in the motor characteristic, even if the value of current applied to the coil is the same, the torque becomes greater as the gap length becomes shorter, i.e., the torque becomes smaller as the gap length becomes longer. Therefore, if the gap length GAP is made small with respect to the demanded torque, only a small current value i is necessary to apply to the coil 113, and this makes it possible to reduce copper loss. For this reason, it is possible to reduce copper loss in the example in FIG. 18, by decreasing the target gap length GAP* from 6 mm (Point B) to 1 mm (Point C).

As described above, in the present preferred embodiment, the target gap length setting map is based on results of experiments conducted with comprehensive evaluation of a balance between the driver's desire (torque) and influence from iron loss and copper loss.

When the gap length control routine shown in FIG. 12 is completed, the electronic controller 310 advances the process to Step S34 of the main control routine shown in FIG. 9. In Step S34, a determination is made whether or not the main switch 5 has been turned off. If it has not been turned off (S34: No), the process in Steps S14 through S34 are repeated. Then, when the human driver turns off the main switch 5, a determination given in Step S34 turns to "Yes", whereupon the wheel drive main control routine comes to an end.

The present preferred embodiment provides the following advantages described below.

A motor output characteristic is varied by adjusting the gap length GAP in the wheel drive motor 100 thereby increasing/decreasing the magnetic flux which flows between the magnet 122 of the rotor 120 and the teeth 112 of the stator 110. Therefore, it is possible to drive the wheel drive motor 100 efficiently from a low-speed range through a high-speed range and to obtain a good vehicle characteristic. Also, it is possible to change the gap length GAP easily by changing a relative positional relationship between the rotor 120 and the stator 110 in the axial direction of the rotation shaft 123.

Since the gap length GAP is adjusted based on the voltage utilization rate Vrate, it is possible to change the output characteristic always at an appropriate timing without being affected by individual variability or operating environment of the wheel drive motor 100. Therefore, it is possible to sufficiently utilize the potential capability of the wheel drive motor 100. Also, the present invention makes it possible to eliminate such a problem as excessive decrease in output torque caused by a delay in changing the output characteristic when the electric vehicle 1 is accelerating, and to reduce a deteriorated drive feeling.

In the gap length control, the gap length GAP is increased to achieve a characteristic capable of obtaining high rotation speed if the voltage utilization rate Vrate has exceeded the threshold value R1; the gap length GAP is decreased to achieve a characteristic capable of obtaining high torque if the voltage utilization rate Vrate has become smaller than the threshold values R2; and no adjustment is made to the gap length GAP, i.e., no change is made to the output characteristic if the voltage utilization rate Vrate is not smaller than the threshold values R2 and not greater than the threshold values R1 (Steps S325 through 327, and S333 in FIG. 12). As described above, it is possible to control the output characteristic of the wheel drive motor 100 easily. Also, since no adjustment is made to the gap length GAP when the voltage utilization rate Vrate is not smaller than the threshold value R2 and not greater than the threshold value R1, it is possible to prevent such a problem of hunting in the control, achieving stable vehicle drive.

In the gap length control, the threshold values R1, R2 are decreased with an increase in the angular acceleration of the wheel drive motor 100 (see FIG. 13). This makes it possible to prevent or minimize a delayed response of the gap changer 200.

For example, when accelerating the electric bike 1, the control voltage to the wheel drive motor 100 is increased to increase the motor rotation speed n. However, if there is a delay in the response from the gap changer 200 to this motor control, switching of the output characteristic is delayed, causing a risk that it will become impossible to increase the motor rotation speed n quickly. Thus, the threshold values R1, R2 are deceased in such a case as this, to allow the voltage utilization rate Vrate to surpass the threshold value R1 at an earlier timing so as to increase the gap length GAP with the acceleration of the wheel drive motor 100.

On the other hand, when decelerating the electric bike 1, the control voltage to the wheel drive motor 100 is decreased to decrease the motor rotation speed n. In this case again, however, if there is a delay in the response from the gap changer 200, it becomes impossible to obtain an optimum motor output characteristic. In this case, the angular acceleration of the wheel drive motor 100 takes a negative value, so the threshold values R1, R2 are increased to allow the voltage utilization rate Vrate to become smaller than the threshold value R2 at an earlier timing so as to decrease the gap length GAP with the acceleration of the wheel drive motor 100.

When the wheel drive motor 100 is not rotating, i.e., when the electric bike 1 is stopped, the gap length GAP is set to a minimum value to provide a high-torque low-rotation-speed characteristic. Therefore, a high torque is obtained when the electric bike 1 is started the next time, offering good acceleration (Step S322 in FIG. 12).

During a period when the accelerator opening-degree AO is not greater than the predetermined opening-degree A1 (0.7 for example), a gap length setting based on the voltage utilization rate Vrate is not performed. Instead, a setting of the target gap length GAP* is performed using a target gap length setting map, based on the rotation speed n of the wheel drive motor 100 and on the motor current (q-axis electric-current command value Iq*). Therefore, it is possible to achieve good reduction in iron loss and copper loss in the wheel drive motor 100 (Steps S323, and S328 through S330 in FIG. 12). For example, the target gap length GAP* is increased with an increase in the rotation speed n of the wheel drive motor 100. This eliminates a case where the induced voltage in the wheel drive motor 100 exceeds the power source voltage Vb of the DC power source 3. This makes it possible to control the wheel drive motor 100 in a high-rotating-speed range. Also, the target gap length GAP* is increased with a decrease in the motor current (q-axis electric-current command value Iq*). This makes it possible to reduce iron loss.

Since the target gap length GAP* is made longer with decrease in the power source voltage Vb, there is no case where the induced voltage in the wheel drive motor 100 exceeds the power source voltage Vb of the DC power source 3. This makes it possible to maintain control of the wheel drive motor 100.

In the gap length control, the detected actual gap-length GAP is fed back, and drive control of the gap changing motor 220 is performed by using proportional item integral calculation (PI) based on the difference (gap*−gap) between the actual gap-length GAP and the target gap length GAP*. Therefore, the response is greatly improved (Step S334 in FIG. 12).

Next, description will be made for an electric bike 1*a* according to a second preferred embodiment of the present invention.

Referring to FIG. 1, the electric bike 1*a* differs from the electric bike 1 according to the first preferred embodiment in that the wheel driving apparatus 10 in the electric bike 1 is replaced by a wheel driving apparatus 10*a*. Further, referring also to FIG. 2, the wheel driving apparatus 10*a* does not have the gap length detector 230 used in the gap changer 200 of the wheel driving apparatus 10, and uses a motor control unit 400 in place of the motor control unit 300. Otherwise, the wheel driving apparatus 10*a* preferably is essentially the same as in the electric bike 1, so by utilizing the same reference symbols as in the electric bike 1, repetitive description will be skipped.

Figure 19:
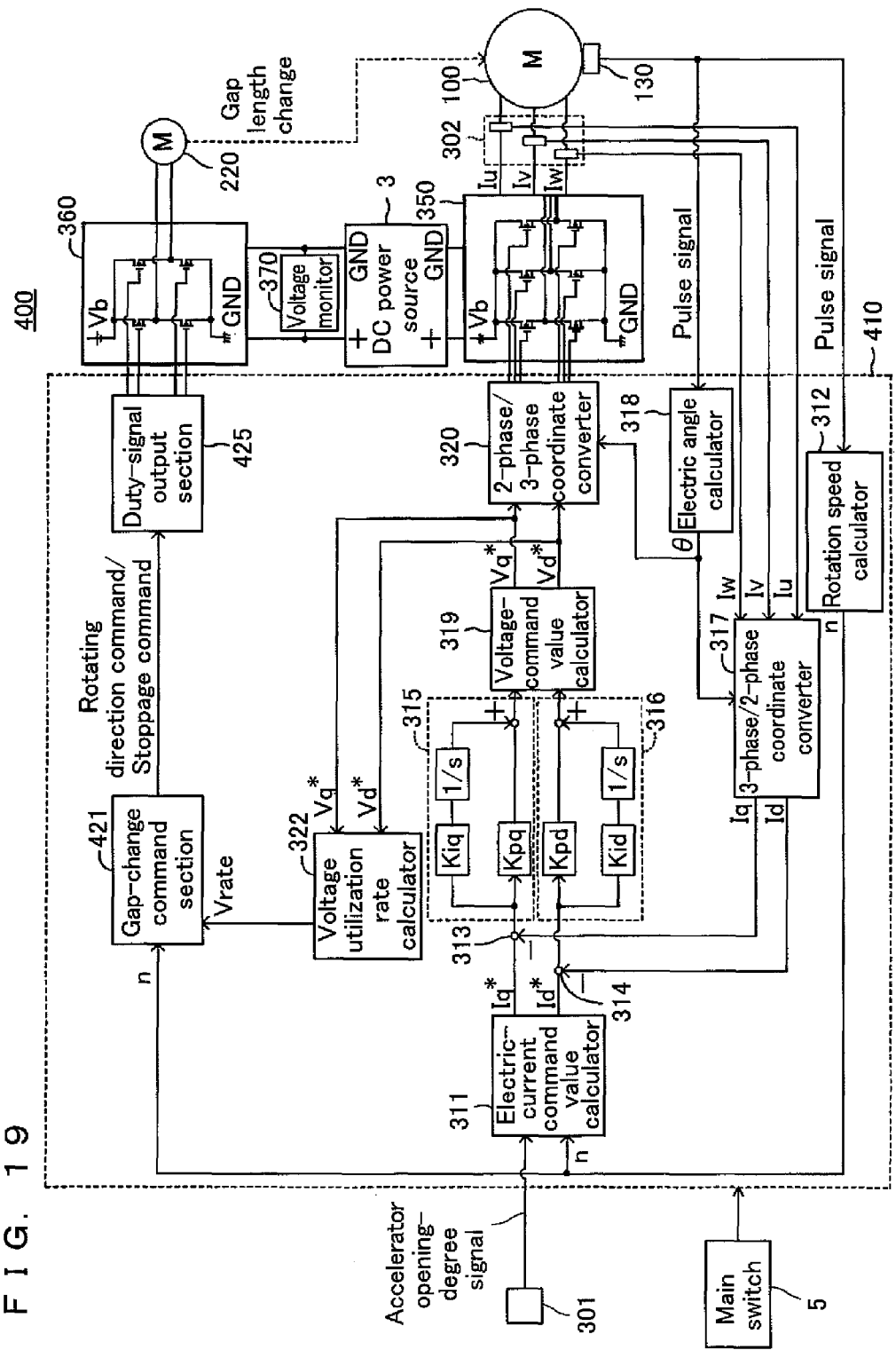
FIG. 19 is a system configuration diagram showing a motor control unit, etc., according to a second preferred embodiment of the present invention.

FIG. 19 is a system configuration diagram of the motor control unit 400.

The motor control unit 400 includes an electronic controller 410 provided primarily by a microcomputer; an inverter circuit 350 as a motor driving circuit which supplies electric power to the wheel drive motor 100 in accordance with commands from the electronic controller 410; an H bridge circuit 360 as a motor driving circuit which supplies electric power to the gap changing motor 220 in accordance with commands from the electronic controller 410; and a voltage monitor circuit 370.

The electronic controller 410 provides drive control to the wheel drive motor 100 and to the gap changing motor 220 independently. A control system for the wheel drive motor 100 is the same as in the first preferred embodiment, so no more description will be given.

The electronic controller 410 includes a gap-change command section 421, a voltage utilization rate calculator 322 and a duty-signal output section 425, in order to provide the drive control to the gap changing motor 220. The gap-change command section 421 is supplied with the rotation speed n of the wheel drive motor 100 calculated by the rotation speed calculator 312; and the voltage utilization rate Vrate calculated by the voltage utilization rate calculator 322. Based on these, the gap-change command section 421 obtains a power-application/power-stoppage command signal and a rotating direction command signal of the gap changing motor 220, and outputs these to the duty-signal output section 425. The process performed by the gap-change command section 421 will be described below in detail with reference to a flowchart.

The duty-signal output section 425 outputs a signal of a constant duty-ratio to the H bridge circuit 360 based on the power-application/power-stoppage command signal and the rotating direction command signal inputted from the gap-change command section 421. The gap changing motor 220 is driven in accordance with the outputted signal.

In the present preferred embodiment, the gap-change command section 421, the duty-signal output section 425 and the H bridge circuit 360 function as a gap controller. The gap-change command section 421 functions as an angular acceleration information obtaining device, a threshold value setting device and a motor stoppage detector. Other configuration relationships are preferably the same as in the first preferred embodiment.

Next, a wheel driving control process performed by the electronic controller 410 will be described.

Figure 20:
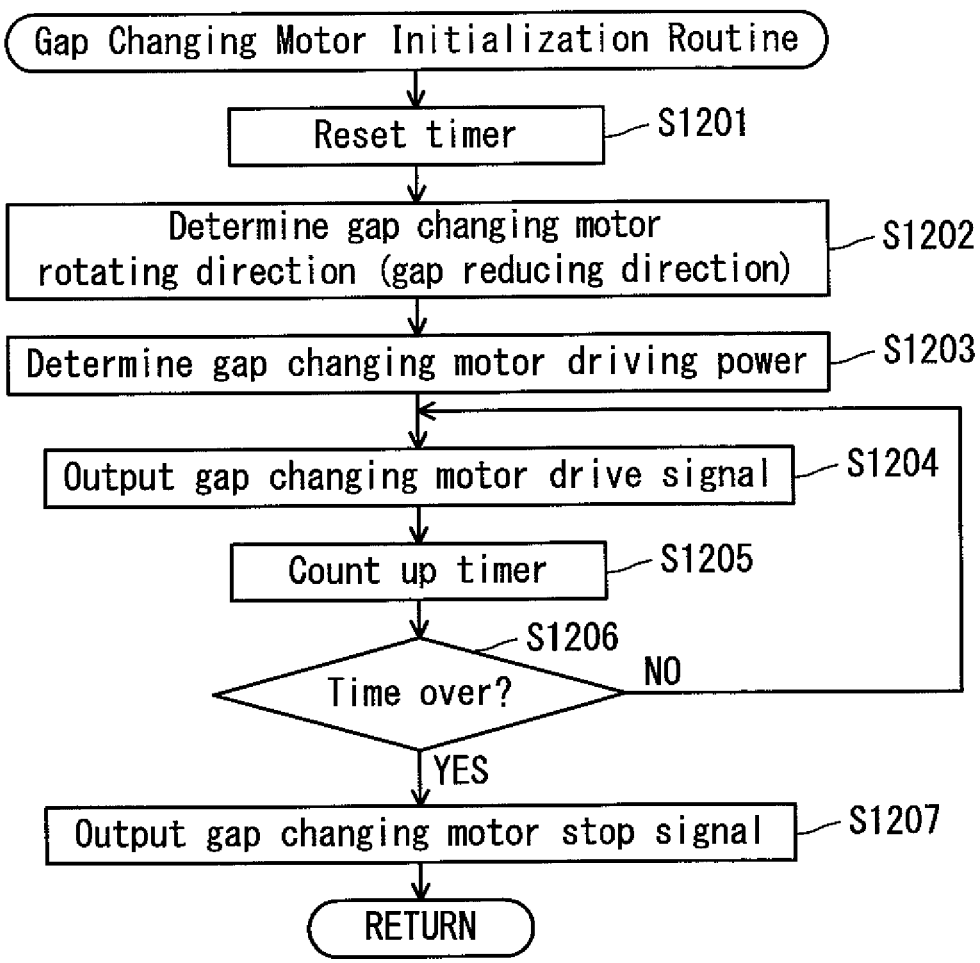
FIG. 20 is a flowchart showing a gap changing motor initialization routine in the second preferred embodiment of the present invention.
Figure 21:
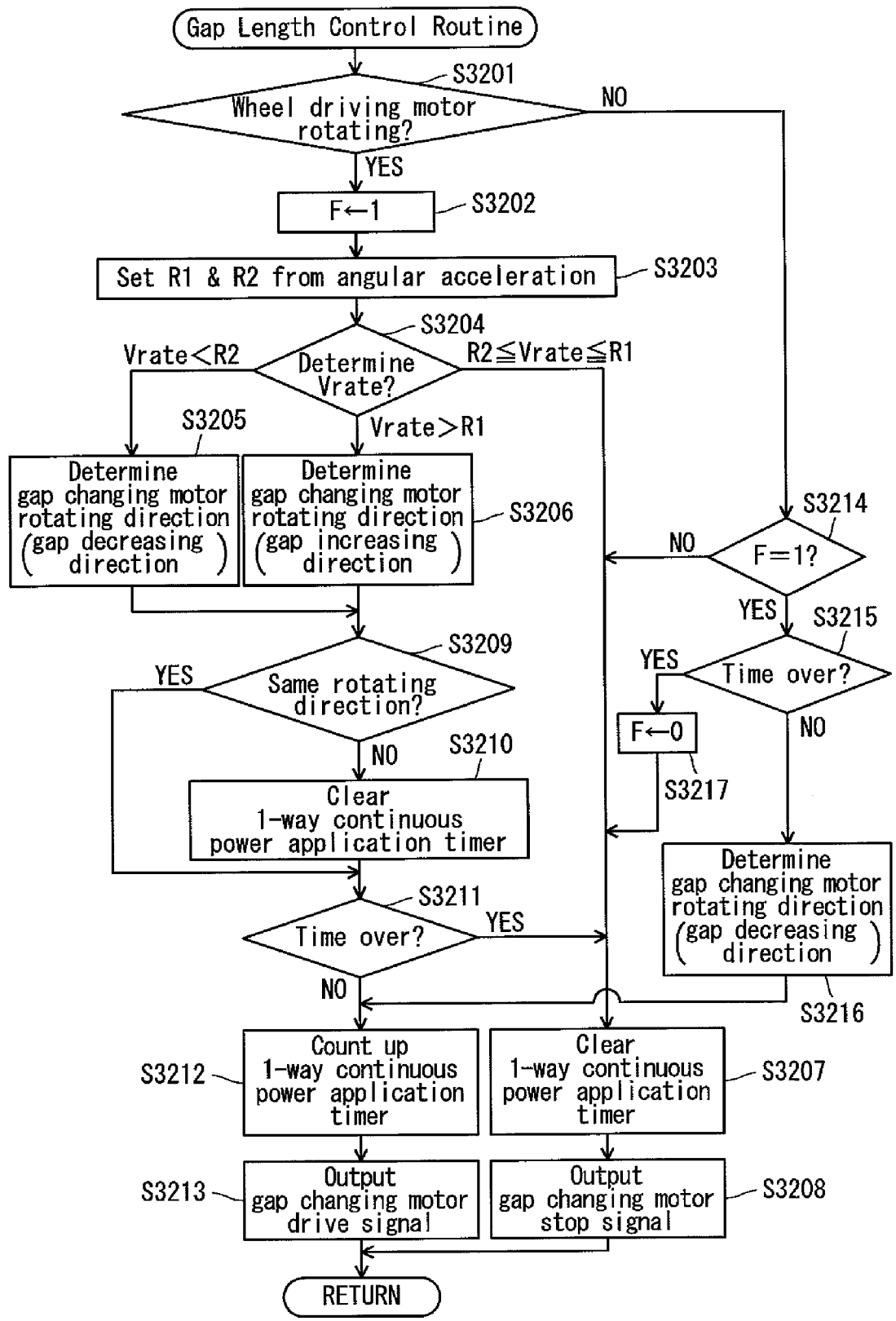
FIG. 21 is a flowchart showing a gap length control routine in the second preferred embodiment of the present invention.

A wheel drive main control routine in the second preferred embodiment shown in FIG. 9 differs from that of the first preferred embodiment in an initialization process of the gap changing motor 220 in Step S12 and in a gap length control process in Step S32. Therefore, description will be made only for these differences. FIG. 20 shows a subroutine as the initialization process of the gap changing motor 220 in Step S12. FIG. 21 shows a subroutine as the gap length control process in Step S32.

First, the initialization process of the gap changing motor 220 will be described with reference to FIG. 20.

When the gap changing motor initialization routine is started, the electronic controller 410 first resets a time count (time count=0) of a time counter in Step S1201. The time counter is a software timer. Next, in Step S1202, the rotating direction of the gap changing motor 220 is determined to be a direction for decreasing the gap. Subsequently, in Step S1203, the driving power to drive the gap changing motor 220 is determined. The driving power is set to a predetermined initialization value, but the value may be the same as a driving power which is used in the gap length control to be described below.

Subsequently, in Step S1204, the electronic controller 410 outputs a drive signal (duty control signal) in accordance with the rotating direction and the driving power as determined above, to the H bridge circuit 360, and drives the gap changing motor 220. Next, in Step S1205, the time counter makes a count up, and in Step S1206, a determination is made whether or not the elapsed time counted by the time counter has reached a set time. Driving of the gap changing motor 220 is continued until the elapsed time has reached the set time. It should be noted here that even if the rotor 120 has returned the origin position before the elapsed time has reached the set time, the rotor 120 is held at the origin position by a mechanical stopper (two end portions of the anti-rotation groove 212b in the nut 212) of the gap changer 200. When the set time is reached (S1206: Yes), a power application stop signal is outputted to the H bridge circuit 360 in Step S1207, and the gap changing motor 220 is stopped. It is preferable that the set time is an amount of time necessary for the rotor 120 in the vehicle driving motor 100 to return from a position which gives the maximum gap length to a position which gives the minimum gap length (origin position).

With this arrangement, the rotor 120 in the vehicle driving motor 100 is reliably returned to the origin position where the minimum gap length is attained. When the rotor 120 in the vehicle driving motor 100 has been returned to the origin position, the gap changing motor initialization routine comes to an end, and the process moves to Step S14 in the main control routine.

Next, the gap length control process in Step S32 of the main control routine will be described with reference to FIG. 21.

When the gap length control routine starts, the electronic controller 410 first determines whether or not the wheel drive motor 100 is rotating in Step S3201. The determination is made based on whether or not the rotation speed n from the rotation speed calculator 312 has a value of zero. Here, description will start with a case where the wheel drive motor 100 is rotating (S3201: Yes).

If the wheel drive motor 100 is rotating, a flag F is set to "1" in Step S3202. At the time when the control routine is started, the flag F is in "0" state. Subsequently, in Step S3203, the threshold values R1, R2 are set based on the angular acceleration of the wheel drive motor 100. This process is the same as the process in Step S324 according to the previous preferred embodiment. Next, in Step S3204, a determination is made as to the size of the voltage utilization rate Vrate. In other words, a determination is made whether or not the voltage utilization rate Vrate is greater than the threshold value R1; smaller than the threshold value R2; or not smaller than the threshold value R2 and not greater than the threshold value R1. A value used as the voltage utilization rate Vrate is the value calculated in the above-described Step S271.

If the voltage utilization rate Vrate is smaller than the threshold value R2 (Vrate<R2), the electronic controller 410 performs Step S3205, and sets the rotating direction of the gap changing motor 220 to the direction for decreasing the gap length in the wheel drive motor 100. If the voltage utilization rate Vrate is greater than the threshold value R1 (Vrate>R1), the electronic controller 410 performs Step S3206, and sets the rotating direction of the gap changing motor 220 to the direction for increasing the gap length in the wheel drive motor 100. If the voltage utilization rate Vrate is not smaller than the threshold value R2 and not greater than the threshold value R1 (R2≦Vrate≦R1), Step S3207 is performed to clear a count value of a one-way continuous power application time counter to zero. Then, Step S3208 is performed to output a duty control signal to the H bridge circuit 360 for stopping the gap changing motor 220. Therefore, the gap changing motor 220 is stopped if the voltage utilization rate Vrate is not smaller than the threshold value R2 and not greater than the threshold value R1. It should be noted here that the one-way continuous power application time counter is a software timer which measures the amount of time for which the gap changing motor 220 is continuously supplied with power in the same rotating direction. The count value in the timer is cleared to zero each time the rotating direction of the gap changing motor 220 is switched as well as each time a stop command signal is outputted.

After the rotating direction of the gap changing motor 220 is set in Step S3205 or in Step S3206, Step S3209 determines whether or not the rotating direction is the same as the previous rotating direction. This gap length control routine is part of the main control routine and is repeated in a predetermined short cycle. Therefore, in Step S3209, a comparison is made between the rotating direction in the previous cycle and the rotating direction which was set in the current cycle to see if the two directions are the same. If the rotating direction of the gap changing motor 220 is reverse from the previous rotating direction, Step S3210 is performed to clear the count value in the one-way continuous power application time counter. If the rotating direction of the gap changing motor 220 is the same as the previous rotating direction, Step S3210 is skipped.

Subsequently, in Step S3211, the electronic controller 410 determines whether or not the continuous power application time measured by the one-way continuous power application time counter has exceeded the set time. If the continuous power application time has not exceeded the set time (S3211: No), Step S3212 is performed to count up the one-way continuous power application time counter, and then in Step S3213, a drive signal (duty control signal) in accordance with the rotating direction is outputted to the H bridge circuit 360. As a result, the gap changing motor 220 rotates in the set rotating direction to change the gap length in the wheel drive motor 100.

On the other hand, if Step S3211 determines that the continuous power application time has exceeded the set time, Step S3207 is performed to clear the count value in the one-way continuous power application time counter, and thereafter, Step S3208 is performed to output a duty control signal for stopping the gap changing motor 220 to the H bridge circuit 360.

Since the present preferred embodiment does not include the gap length detector 230, it is not possible to accurately detect the axial position of the rotor 120 in the wheel drive motor 100, i.e., the gap length. Instead, the one-way continuous power application time counter is utilized to limit time. This makes it possible to prevent such a problem that the rotor 120 has come to the position which gives the maximum or minimum gap length yet power application to the gap changing motor 220 continues. In this case, it is preferable that the set time, which is an amount of time that limits the continuous power application time, is an amount of time necessary for the rotor 120 in the vehicle driving motor 100 to move from the position which gives the maximum gap length to the position which gives the minimum gap length (origin position). This makes sure that the gap length GAP is reliably adjusted within the range from the minimum gap length to the maximum gap length, and makes sure to prevent the problem of excessive power application to the gap changing motor 220.

After the duty control signal is outputted to the H bridge circuit 360 in Step S3208 or Step S3213, the electronic controller 410 leaves the gap length control routine for a while and proceeds to Step S34 in the main control routine.

Description will now cover a case where Step S3201 has determined that the wheel drive motor 100 is not rotating. In this case, Step S3214 first checks whether or not the flag F is set to "1". If the flag F is set to "1" (S3214: Yes), Step S3215 checks whether or not the continuous power application time measured by the one-way continuous power application time counter has exceeded the set time.

If the continuous power application time has not exceeded the set time (S3215: No), Step S3216 is performed to set the rotating direction of the gap changing motor 220 to the direction for decreasing the gap length in the wheel drive motor 100, and then the process proceeds to Step S3212. Therefore, the gap length GAP in the wheel drive motor 100 is decreased by the gap changing motor 220. This is to set the output characteristic of the wheel drive motor 100 to a high-torque low-rotation-speed characteristic so that a high torque will be obtained when starting the wheel drive motor 100.

The above-described tasks of applying power to the gap changing motor 220 and checking the power application continuation time is repeated while the electric bike 1 is stopped. When the power application continuation time has reached the set time, the rotor 120 in the wheel drive motor 100 is at the position which gives the minimum gap length. Thus, when it is determined that the power application continuation time has exceeded the set time (S3215: Yes), the electronic controller 410 performs Step S3217 to set the flag F to "0", performs the above-described clearing process of the one-way continuous power application time counter (S3207) and the stopping process of the gap changing motor 220 (S3208), and then leaves the gap length control routine. Hence, thereafter, checking on the flag F in Step S3214 will result in "No" as long as the vehicle continues to be in the stopped state, and thus, power application to the gap changing motor 220 is prevented.

According to this preferred embodiment, the gap length GAP is controlled based on the voltage utilization rate Vrate as in the first preferred embodiment. Therefore, it is possible to change the motor output characteristic always at an appropriate timing without being affected by individual variability or operating environment of the wheel drive motor 100. As a result, it is possible to efficiently utilize the potential capability of the wheel drive motor 100 from a low-speed range through a high-speed range, and to provide a good vehicle characteristic. Also, the present preferred embodiment can control the gap length GAP without the gap length detector 230, allowing cost reduction, size reduction and weight reduction of the electric bike 1 accordingly. The gap length control is simple and does not require a high processing capability of the microcomputer.

Also, like in the first preferred embodiment, the threshold values R1, R2 are set in accordance with the angular acceleration of the wheel drive motor 100. This makes it possible to reduce response delay of the gap changer 200. Further, when the electric bike 1 is stopped, the gap length GAP is set to its minimum to provide a high-torque low-rotation-speed characteristic. Therefore, a high torque is obtained when the electric bike 1 is started the next time, which provides good acceleration.

The present invention is not limited to the above-described preferred embodiments, and can be varied in many ways.

In each of the above-described preferred embodiments, the wheel drive main control routine (see FIG. 9) is brought to the end when the main switch 5 is turned off. However, for example, the arrangement may be that when turning off of the main switch 5 is detected (S34: Yes), a duty control signal of a predetermined duty ratio is outputted to the H bridge circuit 360 so that drive control of the gap changing motor 220 is performed until the rotor 120 of the wheel drive motor 100 comes to the position which gives the maximum gap length. In other words, there may be a step after Step S34 in the wheel drive main control routine for adjusting the gap length GAP of the wheel drive motor 100 to its maximum value regardless of the voltage utilization rate when the main switch 5 is turned off. In this case, the wheel drive main control routine is brought to the end after this step is performed. Such an arrangement reduces cogging torque generated by rotation of the wheel drive motor 100 in a case where the electric bike 1 must be pushed by hand for transportation.

In the first preferred embodiment, a gap length setting process based on the voltage utilization rate Vrate (which represents the first control mode) is performed if the accelerator opening-degree AO is greater than the predetermined opening-degree A1, but on the other hand, if the accelerator opening-degree AO is not greater than the predetermined opening-degree A1, the voltage utilization rate Vrate is not used as a base but a gap length setting process is performed which takes into account influences from iron loss and copper loss (which represents the second control mode) (FIG. 12: S323 through S330). However, the arrangement may not perform such a switching of gap length control mode based on the accelerator opening-degree AO. For example, a gap length setting process based on the voltage utilization rate Vrate may be always performed regardless of the accelerator opening-degree AO.

In the first and the second preferred embodiments, setting of the threshold values R1, R2 of the voltage utilization rate Vrate are based on the angular acceleration of the wheel drive motor 100. However, the threshold values R1, R2 may be fixed to constant values regardless of the angular acceleration. Also, only one of the threshold values R1, R2 may be set based on the angular acceleration of the wheel drive motor 100.

Further, in the first and the second preferred embodiments, the gap length GAP is set to a minimum when the wheel drive motor 100 is not rotating (FIG. 12: S321, S322; FIG. 21: S3201, S3216). However, such a process may not be performed.

The gap length GAP may be obtained by any appropriate device. For example, the gap length detector 230 (the encoder 231 and the origin-position sensor 232) may be replaced by an arrangement where a magnet is provided on one of the threaded cylindrical body 211 and the substrate 233 and a magnetic sensor is provided on the other for detecting magnetism from the magnet, so that the gap length GAP can be obtained on the basis of magnetic change detected by the magnetic sensor. Another arrangement may be that a magnetic sensor is provided on the nut 212, and a magnet is provided on the substrate 233 so that the gap length GAP can be obtained on the basis of magnetic change detected by the magnetic sensor.

In the first preferred embodiment, the amount of drive of the gap changing motor 220 is determined by a proportional item integral of the difference (GAP*−GAP) between the target gap length GAP* and the actual gap-length GAP. However, the amount of drive may be fixed, and only the rotating direction of the gap changing motor 220 may be determined. In this case, it is possible to reduce the process burden on the electronic controller 310 (the microcomputer).

In the first and the second preferred embodiments, the voltage utilization rate calculator 322 calculates the voltage utilization rate, using a control voltage command value provided by an output from the voltage-command value calculator 319. However, an output from the two-phase/three-phase coordination system converter 320 may be used.

In the first and the second preferred embodiments, the gap changing motor 220 is used to change the gap length GAP. However, other actuators such as a solenoid may be used.

Many variations are possible also in the device arranged to change the gap length in the wheel drive motor 100. For example, in the first and the second preferred embodiments, the rotor 120 is moved axially in order to change the gap length GAP between the rotor 120 and the stator 110. However, a different air gap may be provided in the magnetic path, so that the gap length of this particular gap is changed. An example will be described hereinafter.

FIG. 22 is a schematic view showing a wheel drive motor 500 and a gap changer 600 as a variation. The wheel drive motor 500 is preferably a three-phase axial-gap electric motor. The wheel drive motor 500 includes a stator 510 and a rotor 520. The stator 510 is disposed to face the rotor 520 at a predetermined distance provided in a direction (axial direction) in which a rotation shaft 523 of the rotor 520 extends.

The stator 510 includes a first stator 511 which faces the rotor 520 at an axial predetermined distance, and a second stator 512 which does not face the rotor 520 but faces the first stator 511 at an axial predetermined distance.

The first stator 511 includes a plurality (eighteen, in the present example) of first teeth 513 which are disposed equidistantly on the same circle, and a plurality of coils 514 each wound around one of the first teeth 513. These first teeth 513 and the coils 514 are molded into a resin, integrated into an annular shape, and are fixed to an unillustrated mount which is part of the vehicle body.

Each of the first teeth 513 is provided by a plurality of magnetic steel plates laminated one onto another, with its axial ends flat and not covered by the resin. In each of the first teeth 513, an end 513a (see FIG. 23, FIG. 24) which faces the rotor 520 has a long circumferential dimension, and thus has a T-shaped side view. The coil 514 is wound around a portion of the first teeth 513 excluding the end 513a. Each of the first teeth 513 includes an end 513b which has chamfered circumferential corners facing the second stator 512.

The second stator 512 includes an iron stator yoke 515 and a plurality (the same number as the first teeth 513) of second teeth 516 which are fixed to the stator yoke 515. The stator yoke 515 is formed as an annular shaped disc, and includes a plate portion 515a to which the second teeth 516 are fixed; and a cylindrical portion 515b which extends from an inner circumferential end of the plate portion 515a in an axial direction of the rotor 520. The plate portion 515a has a plurality of fitting holes 515c spaced equidistantly in a circumferential direction. In each of the fitting holes 515c, one of the second teeth 516 is fitted, with its end fitted into the hole, so that second teeth 516 are magnetically connected with the stator yoke 515.

Each of the second teeth 516 faces one of the first teeth 513 in the first stator 511 when the stator yoke 515 is at its origin position of rotation. Each of the second teeth 516 projects beyond the plate portion 515a by a predetermined distance, and has a tip end 516a which has its circumferential corners chamfered.

The rotor 520 includes, for example, an iron rotor yoke 521, and a plurality (twelve, in the present example) of magnets 522 which are fixed to the rotor yoke 521. The rotor yoke 521 includes an outer plate portion 521a in the form of an annular shaped disc and has the magnets 522 fixed thereon; a tapered portion 521b extending from an inner circumferential end of the outer plate portion 521a while decreasing in its diameter; an inner plate portion 521c which is an annular shaped disc extending inwardly from an inner circumferential end of the tapered portion 521b in parallel or substantially parallel to the outer plate portion 521a; and a cylindrical portion 521d extending axially from an inner circumferential end of the inner plate portion 521c.

A motor rotation shaft 523 is inserted into the cylindrical portion 521d. The motor rotation shaft 523 is fixed to the cylindrical portion 521d so as not to be rotatably or axially movably with respect thereto. Therefore, the motor rotation shaft 523 rotates integrally with the rotor 520. The motor rotation shaft 523 has an end (the upper end as seen in FIG. 22) which is connected with a wheel shaft of the wheel 2 via an unillustrated speed reduction mechanism. The magnets 522 are disposed on a main surface of the outer plate portion 521a, which is a surface opposed to the first stator 511, equidistantly and in alternating polarity on the same circle.

The cylindrical portion 521d of the rotor 520 is rotatably supported by a cylindrical mount 533 via bearings 531 and 532. The cylindrical mount 533 is fixed to the vehicle body. The cylindrical mount 533 has an outer circumference to which the above-described cylindrical portion 515b of the second stator 512 is mounted. The cylindrical portion 515b has an inner circumferential surface which makes slidable contact with an outer circumferential surface of the cylindrical mount 533, and thus is rotatable with respect to the cylindrical mount 533, but is not axially movable since the movement is prevented by an unillustrated stopper. Therefore, the second stator 512 is relatively rotatable with respect to the first stator 511 in the rotating direction of the motor rotation shaft 523, but is not relatively movable in the axial direction.

The gap changer 600 changes a relative position of the second stator 512 to the first stator 511 in the rotating direction, and includes a gap length changing motor 601, and a gear portion 602 which transmits rotation of the gap length changing motor 601 to the second stator 512. The gap length changing motor 601 is fixed to part of the vehicle body. The gear portion 602 includes a gear 515*d* which is provided on the outer circumferential surface of the cylindrical portion 515*b* in the second stator 512, and a gear 604 which is fixed to an output shaft 603 of the gap length changing motor 601. The gear 604 engages with the gear 515*d* to transmit a rotating force of the gap length changing motor 601 to the second stator 512. It is preferable to provide reduction gears appropriately between the gear 515*d* and the gear 604 if the gap length changing motor 601 has a low resolution.

Figure 23:
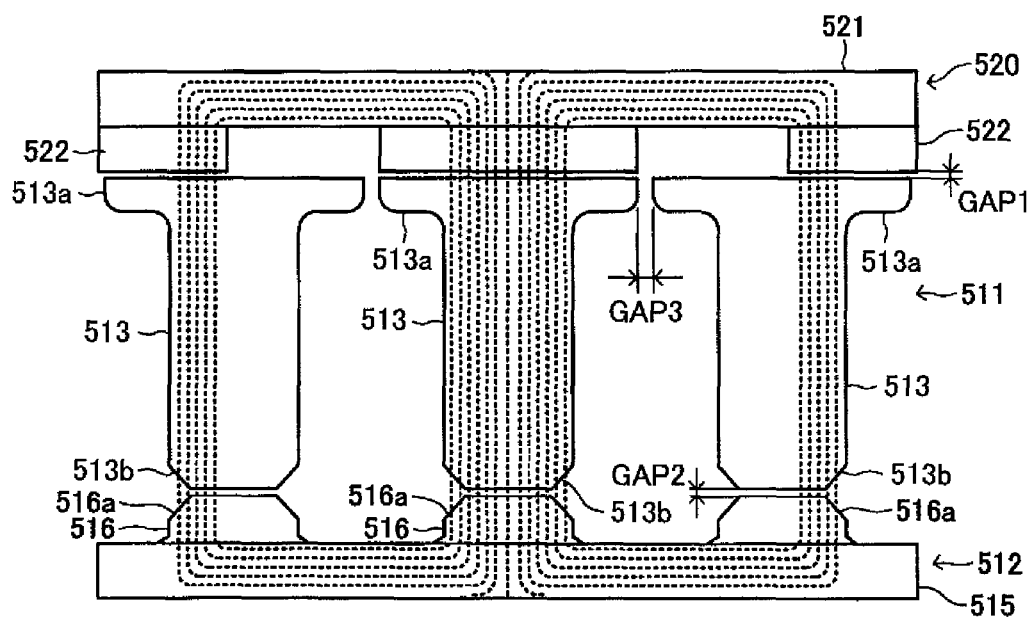
FIG. 23 is a development schematic showing a positional relationship between first teeth and second teeth according to the variation (opposed state).
Figure 26:
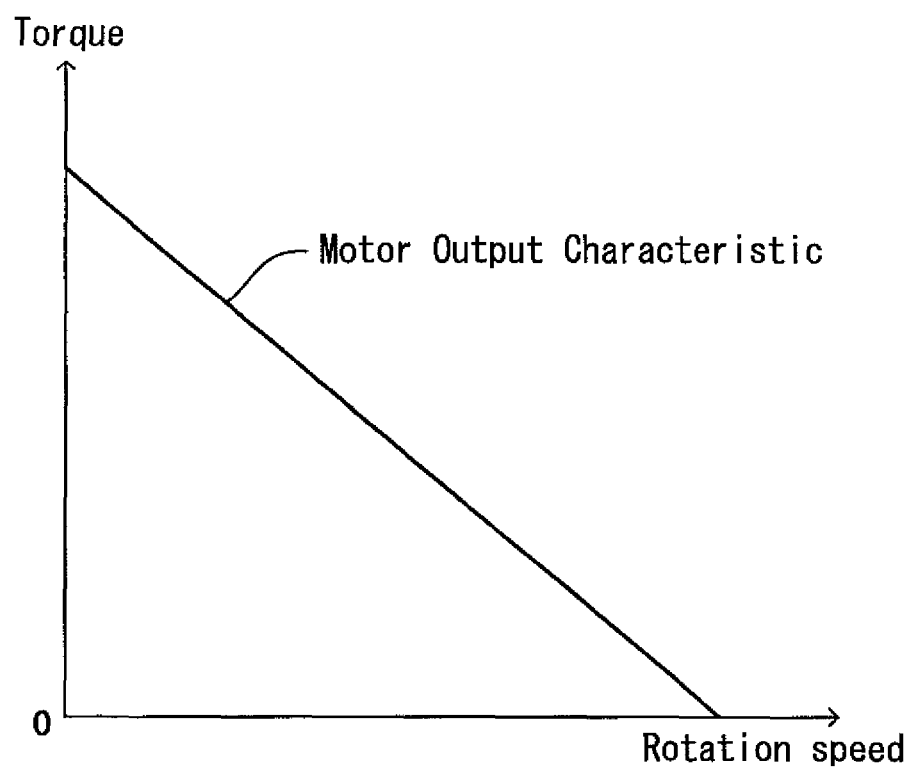
FIG. 26 is an output characteristic chart of an electric motor.
Figure 27:
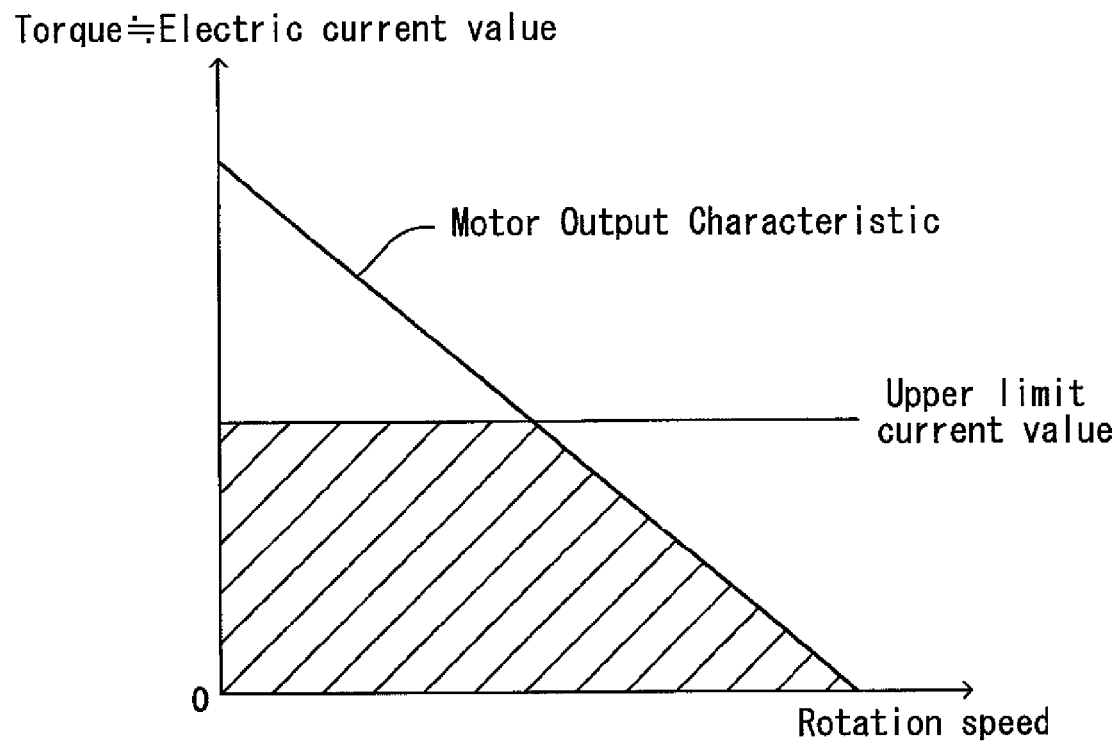
FIG. 27 is an output characteristic chart of the electric motor including an upper limit current value.

FIG. 23 and FIG. 24 are development schematics which show a positional relationship between the first teeth 513 and the second teeth 516 when the wheel drive motor 500 is viewed from the outer circumferential side. FIGS. 25A and 25B are schematic diagrams which gives a two-dimensional interpretation of a state where the second teeth 516 are opposed to the first teeth 513 (FIG. 25A) and a state where they are not opposed to each other (FIG. 25B).

In the wheel drive motor 500, when the first teeth 513 and the second teeth 516 are opposed to each other, a magnetic path (broken lines in the figure) as shown in FIG. 23, is formed by the rotor 520, the first stator 511, and the second stator 512. In this case, a space between the first teeth 513 and the magnets 522, and a space between the first teeth 513 and the second teeth 516 are air gaps which function as magnetic resistances in the magnetic path. A gap length (the length of the air gap) between the first teeth 513 and the magnets 522 will be called GAP 1, and a gap length between the first teeth 513 and the second teeth 516 will be called GAP 2.

When the second stator 512 is rotated to move the second teeth 516 to a position where they are not opposed to the first teeth 513, a magnetic path (broken lines in FIG. 24) is formed as shown in FIG. 24, by the rotor 520 and the first stator 511. In this case, a space between the first teeth 513 and the magnets 522, and a space between mutually adjacent two first teeth 513 are air gaps which function as magnetic resistances in the magnetic path. A gap length of the air gap between mutually adjacent two first teeth 513 will be called GAP 3.

When setting the output characteristic of the wheel drive motor 500 to a high-torque low-rotation-speed characteristic, the second stator 512 is held at the origin position as shown in FIG. 23, i.e., a position where the first teeth 513 and the second teeth 516 are opposed to each other. In this case, the gap length GAP 1 between the first teeth 513 and the magnets 522, as well as the gap length GAP 2 between the first teeth 513 and the second teeth 516 are substantially the same distance in practical application, and are extremely small. Therefore, these air gaps have a small magnetic resistance.

On the other hand, the gap length GAP 3 between mutually adjacent first teeth 513 is greater than the gap length GAP 2 between the first teeth 513 and the second teeth 516. Therefore, the magnetic resistance in the air gap between mutually adjacent first teeth 513 is greater than the magnetic resistance in the air gap between the first teeth 513 and the second teeth 516. It should be noted here that the gap length GAP 2 and the gap length GAP 3 has a relationship expressed as 2×GAP 2<GAP 3.

Thus, a magnetic flux which is generated between an N-pole magnet 522 and an adjacent S-pole magnet 522 as shown in FIG. 23 flows through the air gap (the gap length GAP 1) between the N-pole magnet 522 and the first teeth 513→the first teeth 513→the air gap (the gap length GAP 2) between the first teeth 513 and the second teeth 516→the second teeth 516→the stator yoke 515→the adjacent second teeth 516→the air gap (the gap length GAP 2) between the adjacent second teeth 516 and the adjacent first teeth 513→the adjacent first teeth 513→the air gap (the gap length GAP 1) between the adjacent first teeth 513 and the S-pole magnet 522→the S-pole magnet 522→the rotor yoke 521, with very little of the flux penetrating the air gap (the gap length GAP 3) between the first teeth 513.

When setting the output characteristic of the wheel drive motor 500 to a low-torque high-rotation-speed characteristic, the second teeth 516 are moved as shown in FIG. 24, to the middle of two adjacent first teeth 513 so that the first teeth 513 and the second teeth 516 are not opposed to each other. In this case, the gap length between the first teeth 513 and the second teeth 516 increases from GAP 2 to GAP 4. For this reason, the gap length GAP 3 between two adjacent first teeth 513 is now smaller than the gap length GAP 4 between the first teeth 513 and the second teeth 516. Therefore, the magnetic resistance between adjacent first teeth 513 is now smaller than the magnetic resistance between the first teeth 513 and the second teeth 516.

Thus, a magnetic flux which is generated between an N-pole magnet 522 and an adjacent S-pole magnet 522 as shown in FIG. 24 flows through the air gap (the gap length GAP 1) between the N-pole magnet 522 and the first teeth 513→an end 513*a* of the first teeth 513→the air gap (the gap length GAP 3) between the end 513*a* of the first teeth 513 and an end 513*a* of the adjacent first teeth 513→the end 513*a* of the adjacent first teeth 513→the air gap (the gap length GAP 1) between the adjacent first teeth 513 and the S-pole magnet 522→the S-pole magnet 522→the rotor yoke 521. In this case, therefore, there is virtually no magnetic flow through portions of the first teeth 513 where the coils 514 are wound around.

As described, according to the variation again, it is possible to change the motor output characteristic by changing the gap length of a gap in the magnetic path of the wheel drive motor 500. In the present example, description was made for two positions of the second teeth 516, i.e., of the second stator 512. However, the motor output characteristic can be varied to multiple levels by adjusting the relative position of the second stator 512 to the first stator 511 in the rotating direction through drive control performed to the gap changing motor 601. In this case, it is preferable as in the preferred embodiment described above, that the motor control unit 300 or 400 is used to control the gap adjusting motor 601 based on the voltage utilization rate.

For example, through a drive control performed to the gap changing motor 601, the relative angle of rotation of the second teeth 516 to the first teeth 513, i.e., the relative angle of the second teeth 516 to the first stator 511, may be controlled in a range from the origin position up to a maximum of ten degrees, with an increment of one degree. In this case, an angle detection sensor (not illustrated) may be provided to detect the rotation angle of the second stator 512, so as to obtain a difference between the actual detected rotation angle and a target rotation angle which is set in accordance with the voltage utilization rate, and to provide feedback control to the gap changing motor 601 in accordance with the obtained difference.

It should be noted here that when changing the relative position of the second teeth stator 512 to the first stator 511 in the rotating direction, the air gap between the two stators changes as follows. While the second teeth 516 are opposed to the first teeth 513, the gap length continues to be GAP 2 and the change occurs only in the cross-sectional area. Thereafter, when the second teeth 516 comes to a position where they are not opposed to the first teeth 513, the gap length becomes GAP 4 and varies in accordance with the rotation angle. Therefore, it is preferable that a range of rotation of the second stator 512 within which desired motor output characteristics are available should be found for use in the gap length control.

It is also possible to employ a sensor-less system as in the second preferred embodiment in the control of the relative rotation angle of the second stator 512 to the first stator 511. In this case, it is preferable to provide a mechanical stopper (not illustrated) which limits an end position of rotation of the second stator 512, and a timer which limits one-way continuous power application time to the gap changing motor 601.

According to this variation, the gap length is changed through adjustment of the relative position in the rotating direction between the first stator 511 and the second stator 512 and therefore, the gap length change can be performed easily without providing an axial space for relative movement as is needed in the first and the second preferred embodiments.

It should be noted here that the magnets provided on the main surface, i.e., a surface of the outer plate portion 521a facing the first stator 511, may be provided by, for example, a single member such as a ring-shaped bond magnet magnetized to have a plurality of N poles and S poles to occur alternately with each other in a circumferential direction.

In the above-described preferred embodiment, an accelerator opening-degree AO is used as accelerator information, and the accelerator opening-degree AO is compared to a predetermined opening-degree A1 in Step S323 in FIG. 12. However, accelerator information may be provided by the amount of accelerator operation, i.e., an accelerator opening-degree signal. In this case, the accelerator operation-amount sensor 301 represents accelerator information obtaining device. Then, the accelerator opening-degree signal is compared to a predetermined value in Step S323 in FIG. 12.

Angular acceleration information is not limited to the angular acceleration per se of the wheel drive motor 100. Rotation speed information is not limited to rotation speed per se of the wheel drive motor 100. Voltage information is not limited to a power source voltage Vb in the DC power source 3.

The present invention is suitably applied not only to electric bikes but also any other electric vehicles.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wheel driving apparatus for driving a wheel of an electric vehicle, the wheel driving apparatus comprising:
    an electric motor arranged to drive the wheel;
    a gap changer arranged to change a gap length of an air gap in the electric motor;
    an accelerator information obtaining device arranged to obtain accelerator information regarding an amount of acceleration in the electric vehicle;
    a voltage calculation device arranged to calculate a control voltage command value based at least on the accelerator information obtained by the accelerator information obtaining device;
    a voltage utilization rate calculation device arranged to calculate a voltage utilization rate based on a maximum value of the control voltage command value and the control voltage command value calculated by the voltage calculation device; and
    a gap controller arranged to control the gap changer based on the voltage utilization rate calculated by the voltage utilization rate calculation device so as to adjust the gap length.

2. The wheel driving apparatus according to claim 1, wherein the gap controller is arranged to control the gap changer so as to increase the gap length if the voltage utilization rate is greater than a first threshold value, and to decrease the gap length if the voltage utilization rate is smaller than a second threshold value which is smaller than the first threshold value.

3. The wheel driving apparatus according to claim 2, further comprising:
    an angular acceleration information obtaining device arranged to obtain angular acceleration information regarding an angular acceleration of the electric motor; and
    a threshold value setting device arranged to decrease at least one of the first threshold value and the second threshold value with an increase in the angular acceleration information obtained by the angular acceleration information obtaining device.

4. The wheel driving apparatus according to claim 2, wherein the gap controller is arranged to control the gap changer based on the voltage utilization rate if the accelerator information has a value greater than a predetermined value but does not control the gap changer based on the voltage utilization rate if the accelerator information has a value not greater than the predetermined value.

5. The wheel driving apparatus according to claim 4, further comprising a rotation speed information obtaining device arranged to obtain rotation speed information regarding a rotation speed of the electric motor; wherein
    the gap controller is arranged to provide a first control mode to control the gap changer based on the voltage utilization rate if the accelerator information has a value greater than the predetermined value, and a second control mode to control the gap changer based on the rotation speed information obtained by the rotation speed information obtaining device if the accelerator information has a value not greater than the predetermined value.

6. The wheel driving apparatus according to claim 5, wherein the gap controller controls the gap changer so as to increase the gap length with an increase in the rotation speed information in the second control mode.

7. The wheel driving apparatus according to claim 5, wherein the voltage calculation device includes an electric-current command value calculation device arranged to calculate a q-axis electric-current command value in a d-q axis coordinate system for the electric motor based on the accelerator information; and
    the gap controller is arranged to control the gap changer so as to increase the gap length with a decrease in the q-axis electric-current command value in the second control mode.

8. The wheel driving apparatus according to claim 6, wherein the electric vehicle further includes a DC power source arranged to supply electric power to the electric motor, and the wheel driving apparatus further comprises:
- a voltage information obtaining device arranged to obtain voltage information regarding a voltage in the DC power source; wherein
- the gap controller is arranged to control the gap changer so as to increase the gap length with a decrease in the voltage information in the second control mode.

9. The wheel driving apparatus according to claim 1, further comprising a motor stoppage detector arranged to detect a stoppage of rotation of the electric motor; wherein
- the gap controller is arranged to control the gap changer so as to minimize the gap length regardless of the voltage utilization rate if the motor stoppage detector detects a stoppage of rotation of the electric motor.

10. The wheel driving apparatus according to claim 1, wherein the electric vehicle further includes a main switch, and the gap controller is arranged to control the gap changer so as to maximize the gap length regardless of the voltage utilization rate if the main switch is turned off.

11. The wheel driving apparatus according to claim 1, further comprising a gap length detector arranged to detect the gap length, wherein the gap controller provides a feedback control to the gap changer based on a difference between a target gap length obtained by a calculation based on the voltage utilization rate and the gap length detected by the gap length detector.

12. The wheel driving apparatus according to claim 1, wherein the electric motor is an axial air gap motor including:
- a rotor having a rotation shaft; and
- a stator facing the rotor at a distance in a direction in which the rotation shaft extends; wherein
- the gap changer is arranged to change the gap length between the rotor and the stator.

13. The wheel driving apparatus according to claim 1, wherein the electric motor is an axial air gap motor including:
- a rotor having a rotation shaft; and
- a stator facing the rotor at a distance in a direction in which the rotation shaft extends; wherein
- the stator includes a first stator and a second stator opposed to each other at a distance in the direction in which the rotation shaft extends and variable in terms of a relative position in a rotating direction of the rotor; and
- the gap changer is arranged to vary the relative position of the first stator and the second stator in the rotating direction thereby changing the gap length between the first stator and the second stator.

14. An electric vehicle comprising the wheel driving apparatus according to claim 1.

* * * * *